United States Patent [19]

Yamazaki et al.

[11] 4,254,438
[45] Mar. 3, 1981

[54] CODING METHOD FOR FACSIMILE SIGNAL

[75] Inventors: Yasuhiro Yamazaki, Hiratsuka; Yasushi Wakahara, Yokohama; Kazunori Matsuo, Hoya, all of Japan

[73] Assignee: Kokusai Denshin Denwa Kabushiki Kaisha, Japan

[21] Appl. No.: 88,478

[22] Filed: Oct. 26, 1979

[30] Foreign Application Priority Data

Dec. 13, 1978 [JP] Japan ................................ 53-153189
Dec. 21, 1978 [JP] Japan ................................ 53-159491

[51] Int. Cl.³ ............................................. H04N 7/12
[52] U.S. Cl. ..................................... 358/261; 358/260
[58] Field of Search ................ 358/138, 260, 261, 263

[56] References Cited

U.S. PATENT DOCUMENTS 3,976,831  8/1976  Danell et al. ...................... 358/138
4,057,834  11/1977  Nakagome et al. ................. 358/260

Primary Examiner—Robert L. Griffin
Assistant Examiner—Joseph A. Orsino, Jr.
Attorney, Agent, or Firm—Robert E. Burns; Emmanuel J. Lobato; Bruce L. Adams

[57] ABSTRACT

A coding method for facsimile signals in which a binary facsimile signal is divided into fundamental picture elements sampled every N picture elements and elemental picture elements lying between adjacent ones of the fundamental picture elements. The fundamental picture elements are sequentially encoded for each succession, whereas the elemental picture elements are encoded only at required ones to effectively reduce the transmission time.

7 Claims, 19 Drawing Figures

Fig. 1A
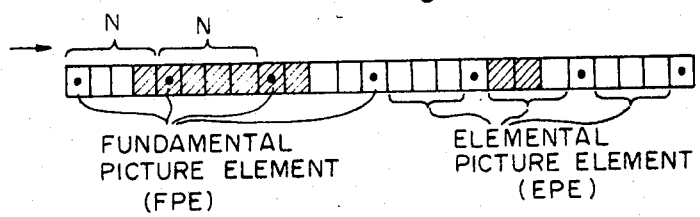
FUNDAMENTAL
PICTURE ELEMENT
(FPE)
ELEMENTAL
PICTURE ELEMENT
(EPE)
Fig. 1B
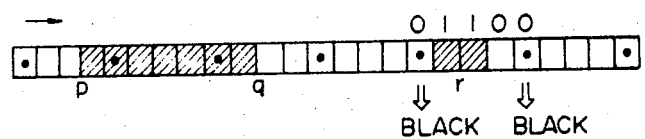
Fig. 1C
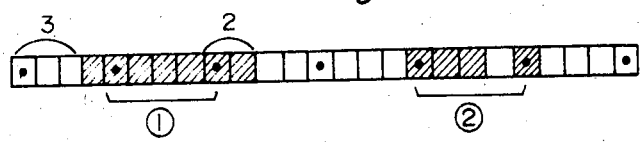
Fig. 1D
| FPE | | | | | EPE (2) | | EPE (1) | |
|---|---|---|---|---|---|---|---|---|
| W1 | B2 | W1 | B2 | W1 | 2ND | ORIGINAL INF. | 3 | 2 |
| 00 | 10 | 00 | 10 | 00 | 01 | 01100 | 10 | 01 |
| (WHITE) | (BLACK) | | | | | | | |

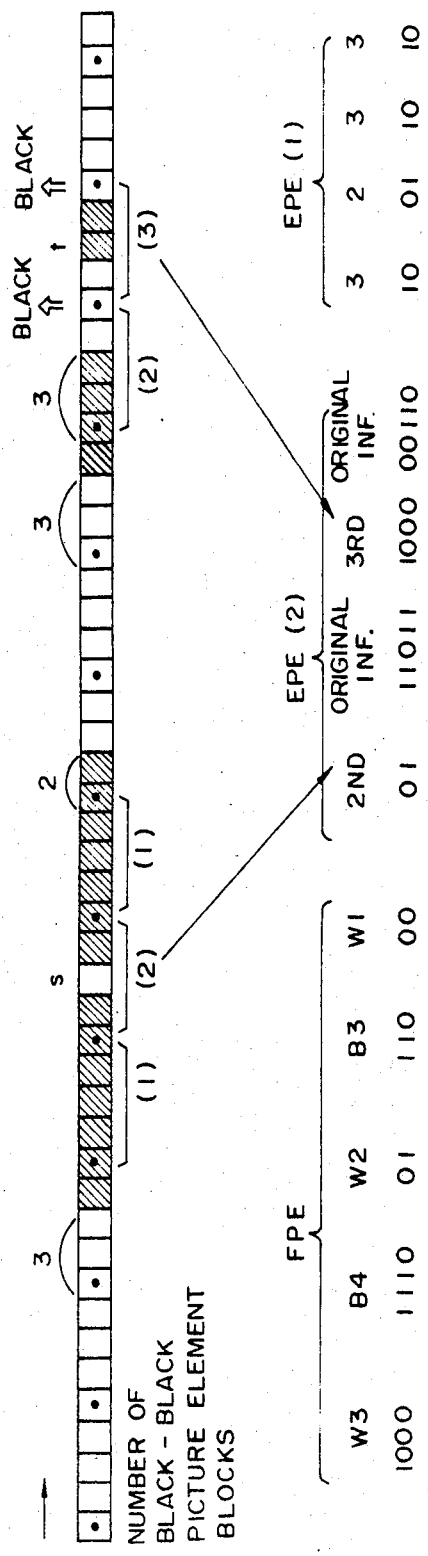

Fig. 3

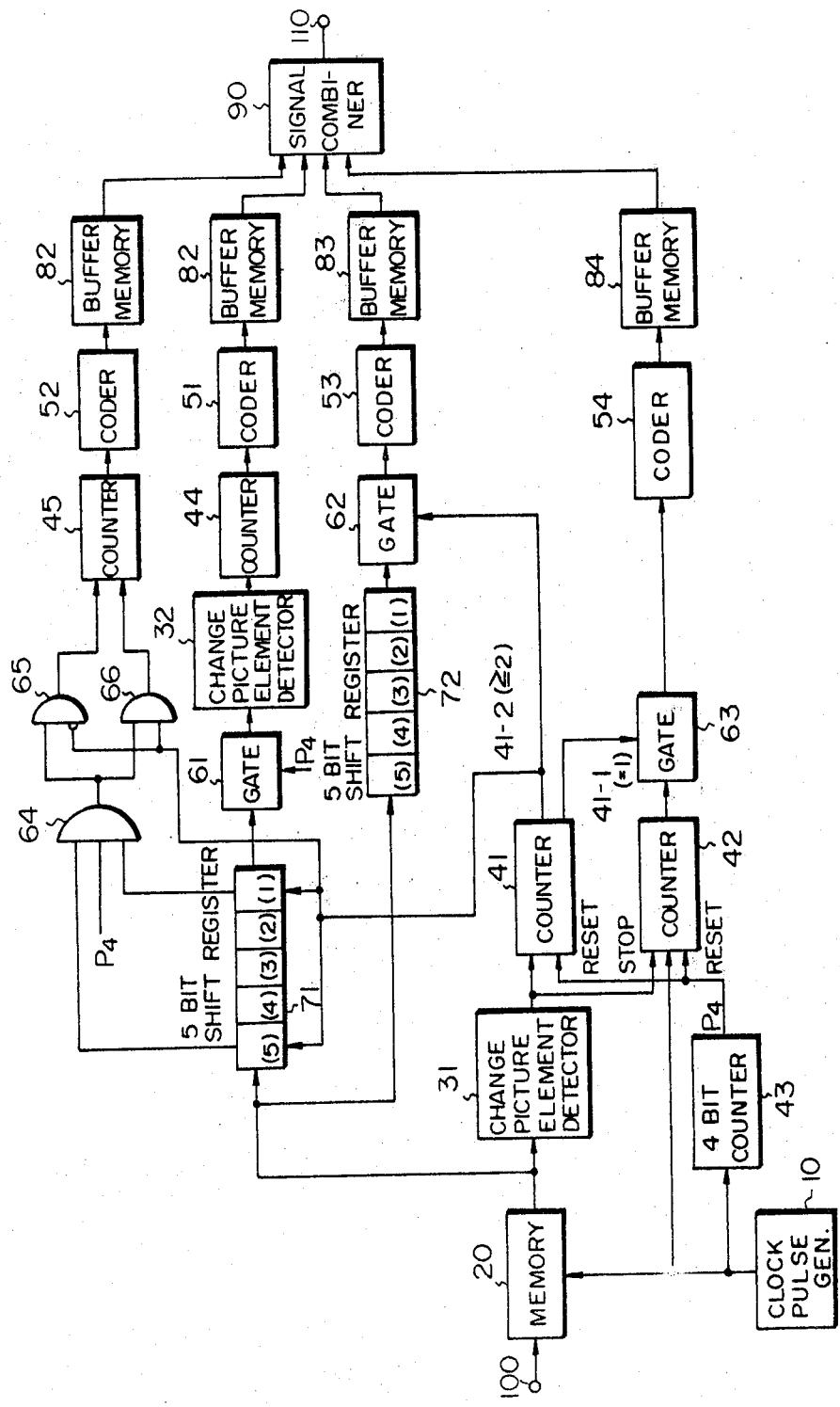

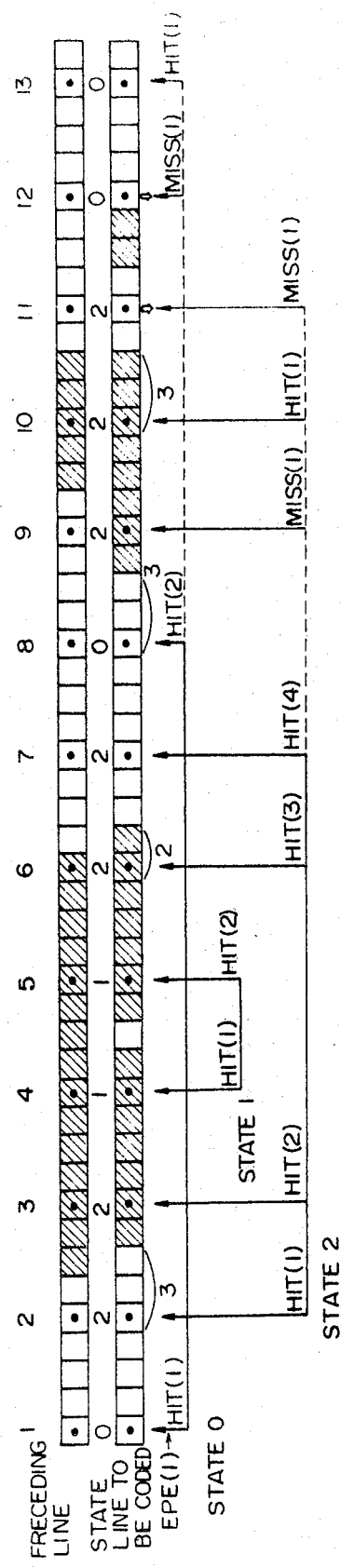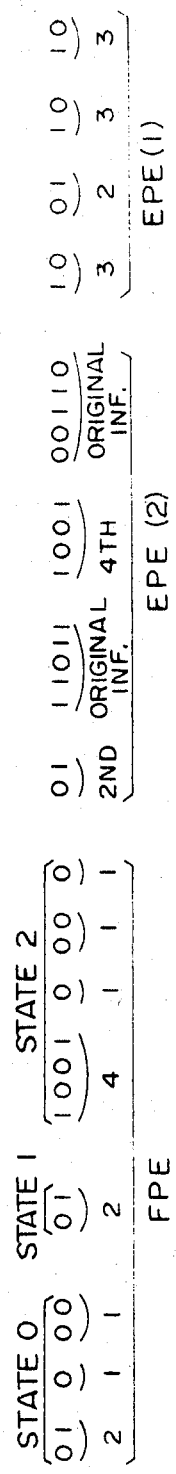
Fig. 8A
Fig. 8B

CODING METHOD FOR FACSIMILE SIGNAL

BACKGROUND OF THE INVENTION

1. Field of the Invention

This invention relates to a coding method for facsimile signals and, more particularly, to a one-dimensional coding method and a two-dimensional coding method for facsimile signals.

2. Description of the Prior Art

As a coding method for a binary signal, such as a monochrome binary facsimile signal, it is desirable to greatly reduce redundancy included in a signal for cutting down the transmission time and to lessen the influence of a transmission error on the received picture quality.

In general, however, there is a defect that the more the compression efficiency improves, the more the received picture quality is affected by the transmission error.

SUMMARY OF THE INVENTION

An object of the present invention is to provide, with a view to overcome such a defect, a one-dimensional coding method for a facsimile signal which permits reduction of the transmission time about 7%, in terms of data compression effect, and alleviation of the influence of the transmission error about 30%, as compared with prior art systems.

Another object of the present invention is to provide a two-dimensional coding method which permits further shortening of the transmission time and a substantial reduction of the influence of the transmission error by expanding the abovesaid method to a two-dimensional method.

BRIEF DESCRIPTION OF THE DRAWING

The principle, construction and operation of this invention will be clearly understood from the following detailed description taken in conjunction with the accompanying drawing, in which:

FIGS. 1A, 1B, 1C, 1D and 2 show examples of facsimile signals explanatory of the principles of this invention;

FIG. 3 is a signal diagram showing examples of signal conversion in other embodiments of this invention;

FIG. 4A is a block diagram illustrating an embodiment of this invention;

FIGS. 8A, 8B, 11A, 11B and 12 are diagrams showing examples of facsimile signals explanatory of the principles of this invention;

DETAILED DESCRIPTION

Figure 7:
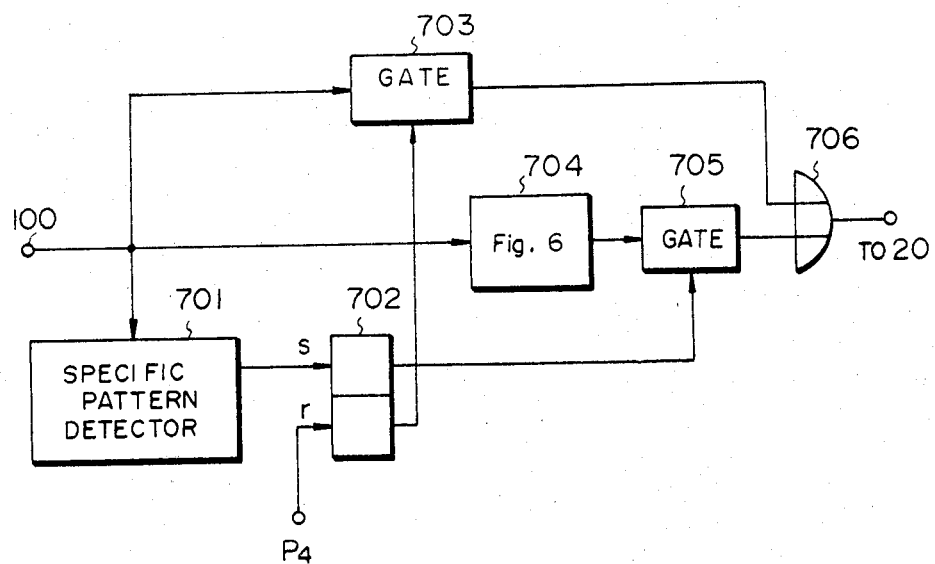
FIG. 7 is a block diagram explanatory of another embodiment of this invention.

FIGS. 1 and 2 show, by way of example, one line of a facsimile signal, unhatched sections indicating white picture elements and hatched sections black picture elements.

The picture elements are divided into fundamental picture elements every N picture elements and elemental picture elements lying between the fundamental picture elements. FIGS. 1 and 2 show a case of $N=4$, but N may also be other integers. In the following, the fundamental picture elements are indicated by black dots in the frames.

In a case where two or more of the elemental picture elements lying between adjacent ones of the fundamental picture elements are those picture elements whose information has changed with respect to immediately preceding picture elements (white to black or black to white) respectively, the fundamental picture elements on their both ends are once rendered into black picture elements. If such fundamental picture elements are black, they are held unchanged. In the example of FIG. 1B, the part r corresponds to the abovesaid picture elements. Such conversion will hereinafter be referred to as pre-processing. Being subjected to the pre-processing, the line shown in FIG. 1B becomes such as shown in FIG. 1C.

Then, the fundamental picture element train in FIG. 1C is encoded, for example, into run-length codes. In this example, the result is white 1, black 2, white 1, black 2 and white 1. This coding employes, for the white run, Table 1(A) generally known as the $B_1$ code and, for the black run, the present inventors' devised encoding code of FIG. 1B (hereinafter referred to as the 1, 2, 3, $4B_1$ code); as a consequence, the fundamental picture element train becomes such as shown in FIG. 1D in which the black and white picture elements are arranged alternately with each other, i.e.

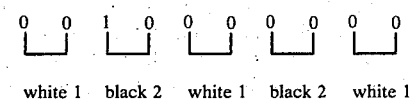

white 1    black 2    white 1    black 2    white 1

Next, the position of each block in which two or more transition points exist in the elemental picture elements lying between adjacent black fundamental picture elements (which block will hereinafter be referred to as the elemental picture element (2)), that is, the position of each processed block is encoded with the $B_1$ code of Table 1(A), and original information of this elemental picture element block is encoded.

Thus, in the example of FIG. 1, two successive black fundamental picture elements occur twice, as indicated by ① and ② in FIG. 1C; but the block ① is not the elemental picture element (2), and the pre-processed picture element block ② is subjected to the abovesaid coding. Then "2" representing the second position is encoded (01), and at the same time, original information of the picture element block (see FIG. 1B) is encoded to obtain "01100".

TABLE 1

| | (A) $B_1$ code | | (B) 1.2.3 $4B_1$ code |
|---|---|---|---|
| n | Code | n | Code |
| 1 | 0 0 | 1 | 0 |
| 2 | 0 1 | 2 | 1 0 |
| 3 | 1 0 0 0 | 3 | 1 1 0 |

TABLE 1-continued

| 4 | 1 0 0 1   | 4 | 1 1 1 0       |
|---|-----------|---|---------------|
| 5 | 1 0 1 0   | 5 | 1 1 1 1 0 0   |
| 6 | 1 0 1 1   | 6 | 1 1 1 1 0 1   |
| 7 | 1 1 0 0 0 0 | 7 | 1 1 1 1 1 0 0 0 |
| 8 | 1 1 0 0 0 1 | 8 | 1 1 1 1 1 0 0 1 |
| 9 | 1 1 0 0 1 0 | 9 | 1 1 1 1 1 0 1 0 |

(C)
2-bit fixed code

| n | Code |
|---|------|
| 1 | 0 0  |
| 2 | 0 1  |
| 3 | 1 0  |
| 4 | 1 1  |

Next, in a case where adjacent fundamental picture elements have their information changed from white to black or black to white, the position of the elemental picture element of the information change (The number of change point is "1", and since a case where two or more transition points exists in a block is already treated the picture element will hereinafter be referred to as the elemental picture element (1).) in each picture element block between such adjacent fundamental picture elements is encoded in terms of the distance between it and the fundamental picture element immediately preceding it, using a fixed length code.

In the example of FIG. 1, since N=4, the encoding code is a 2-bit fixed code and becomes as shown in Table 1(C). The picture elements corresponding to the elemental picture element (1) are those indicated by p and q in FIG. 1B, and since they are positioned third and second from the fundamental picture elements respectively immediately preceding them, "3" and "2" are encoded to obtain "10" and "01".

The picture elements encoded by the above method are arranged in the order of fundamental picture element—elemental picture element (2)—elemental picture element (1), and outputted as an encoded signal.

Next, an example of FIG. 2 will be described in brief. Also in this example, N=4, and the elemental picture elements (2) lie in blocks s and t. Since the fundamental picture elements on both sides of the block s are both black in original information, so that this block s is not preprocessed, but the block t is pre-processed to change the fundamental picture elements on both sides thereof to black. The result of this encoding of the fundamental picture element train is such as shown under FIG. 2. Further, the elemental picture element (2) exists at the abovesaid two positions, and their position numbers and original information are encoded.

Namely, the block s is a second one as a picture element block sandwiched between adjacent black fundamental picture elements, and encoded into "01" using the $B_1$ code. Its original information is "11011". The position number of the picture element block sandwiched between adjacent black fundamental picture elements as described above (which block will hereinafter be referred to as the black-black picture element block) is encoded. Upon completion of the encoding, a counter for position number counting use is reset to zero, so that the picture element block t becomes the next third one, which is encoded into "1000". The original information of this picture element block is 00110".

As is apparent from FIG. 2, the elemental picture element (1) exists at four places, and their values "3", "2", "3" and "3" are each encoded using the 2-bit fixed length code. Accordingly, the output of the encoded signal series in this case is "10", "01", "10" and "10" as shown in the lower part of FIG. 2.

In the above, the $B_1$ code and the 1, 2, 3, $4B_1$ code are used as encoding codes for the white run and the black run, respectively, but the $B_1$ code may be also used for both of the white and the black run, or some other encoding codes may be also employed.

Next, in order to facilitate a better understanding of the encoding means described above, it will be enumerated as coding algorithm (I).

Coding Algorithm (I)

(i) IN a facsimile signal of one line, fundamental picture elements are determined every N picture elements (N=a positive integer) in the scanning line direction, and picture elements lying between adjacent ones of the fundamental picture elements are defined as elemental picture elements.

(ii) In a case where two or more change picture elements, each having information changed from that of the picture element immediately preceding it (which change picture elements will hereinafter be referred to as the elemental picture element (2)), are included in the elemental picture elements in the picture element block lying between adjacent ones of the fundamental picture elements, the fundamental picture elements on both sides of the block are once rendered black by preprocessing.

(iii) Successive white or black fundamental picture elements in the signal train subjected to the processing description (ii) are sequentially encoded.

(iv) For the elemental picture element (2) in a case of two or more black fundamental picture elements occurring in succession, coding is performed for representing the position of this elemental picture element (2) by the number of the black-black picture element block sandwiched between the adjacent black picture elements, and the original information of the picture element block prior to the pre-processing is encoded.

(v) In a case where adjacent ones of the fundamental picture elements each have information changed from white to black or vice versa, the position of the elemental picture element of the information change in the picture element block between the adjacent fundamental picture elements (which elemental picture element will hereinafter be referred to as the elemental picture element (1)) is encoded using, for example, a distance between this elemental picture element and the fundamental picture element immediately preceding it. In this case, it is also possible to use the distance between the elemental picture element and the fundamental picture element immediately following it.

In the system of this invention which performs coding in the above procedure, the facsimile signal is divided into fundamental picture elements and elemental picture elements, and they are respectively subdivided into those elements which are successively encoded and those which are encoded locally or one by one. By mainly employing fixed length codes for the latter coding, high-efficiency coding can be achieved and the influence of the transmission error can be lessened.

For the compression efficiency, Table 2 shows, in respect of the system of this invention and the typical prior art system, i.e. MH system (Modified Huffmann System), the transmission times (in second) in terms of (resolution 8×4 picture elements/mm$^2$) converted into 4800 bps in cases of using A4-size test documents approved by CCITT SG XIV (facsimile). In the table, numerical values in parentheses each represents the rate (%) of a signal in which two picture elements at most are inverted by a bit error.

The table indicates that the time of transmission by the system of this invention is reduced about 7% as compared with that by the MH system.

TABLE 2

| | Document | | | | | | | |
|---|---|---|---|---|---|---|---|---|
| System | No. 1 Letter in English | No. 2 Electronic circuit | No. 3 Slip | No. 4 French sentence | No. 5 French sentence with illustration | No. 6 Graph | No. 7 Japanese sentence | No. 8 Memo |
| MH system | 27.7 | 25.8 | 50.8 | 90.9 | 52.8 | 39.9 | 89.2 | 49.6 |
| System of this invention | 24.2 | 22.6 | 46.7 | 85.2 | 50.1 | 36.9 | 89.4 | 43.5 |
| | (33.7) | (22.6) | (28.8) | (37.4) | (30.5) | (24.3) | (26.5) | (22.5) |

The facsimile signal encoded by the procedure described above can be decoded in the reverse order of encoding. If adjoining fundamental picture elements are both white, the elemental picture elements of the picture element block sandwiched between the fundamental picture elements can be decoded, regarding all of them as white. If the adjoining fundamental picture elements are both black, the decoding is carried out, regarding all the picture elements of the black-black picture element block between the fundamental picture elements as black or after returning them to the form of original information in dependence on whether no change points exist in the picture element block or two or more change points exist (the elemental picture element (2)).

When the fundamental picture element has changed from black to white or vice versa, the code corresponding to the distance between it and the immediately preceding fundamental picture element is decoded. Since the elemental picture element (1) having one change point is encoded with the fixed length code, an error in this part causes reversal of only two picture elements at most and does not extend to the succeeding picture elements, exerting substantially no influence on the received picture quality.

On the other hand, variable length codes are employed for the abovesaid fundamental picture elements and the elemental picture elements (2), the influence of the transmission error is substantially the same as in the prior art method. Accordingly, the method of this invention lessens the influence of the transmission error by the rate of the number of bits of the elemental picture element (1) insusceptible to this error to the number of all bits being coded. This results in the bit error rate being reduced 22 to 37% equivalently in this invention, as indicated by the parenthesized numerical values in Table 2.

In the coding algorithm (I) of this invention described above, the elemental picture element (2) is pre-processed so that the fundamental picture elements on both sides of the picture element block are once rendered into black, and then the elemental picture element (2) is encoded. It is also possible, however, to perform encoding of the elemental picture element (2) after such processing which changes the succeeding one of the two adjoining fundamental picture elements from white to black or vice versa and reverses the status of the picture elements of the picture element block to thereby making the number of change point "1".

Figure 3:
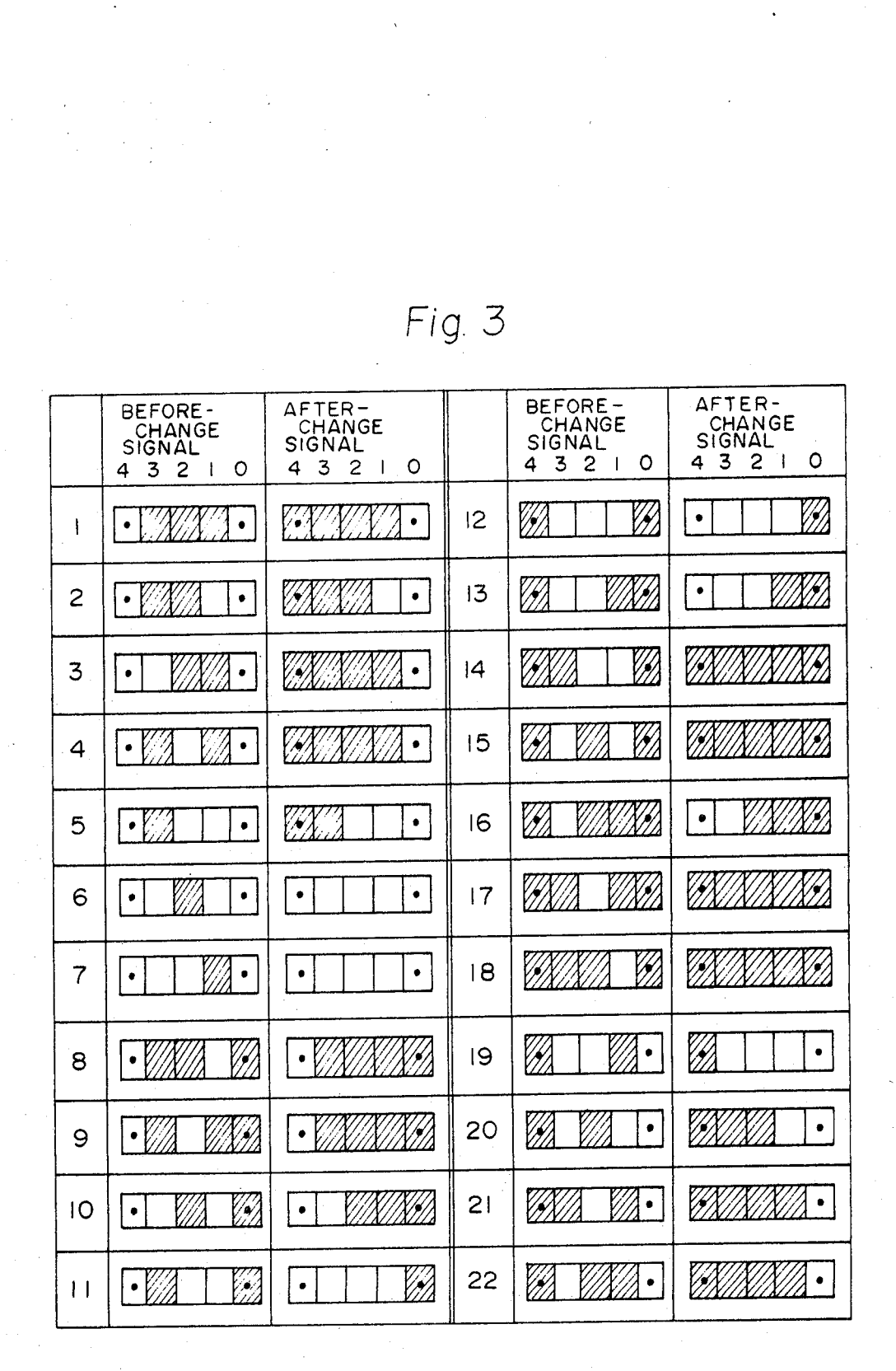

Namely, by converting a before-change signal to an after-change signal, as shown in FIG. 3, the elemental picture elements (2) can all be encoded as the elemental picture elements (1). In FIG. 3, "0" indicates the immediately preceding fundamental picture elements; 1, 2 and 3 represent three picture elements of the picture element block, and 4 indicates the immediately succeeding picture element.

This procedure can be expressed as the following algorithm (II).

Coding Algorithm (II)

(i) In a facsimile signal of one line, fundamental picture elements are determined every N picture elements (N=a positive integer) in the scanning line direction, and picture elements in a picture element block lying between one of the the fundamental picture element and the next one is defined as elemental picture elements.

(ii) In a case where two or more change picture element exist in a block between the adjoining fundamental picture elements, signal conversion is carried out so that the number of change picture elements in the block is reduced to less than 1, that is 1 or 0.

(iii) Successive white and black fundamental picture elements in the picture element train subjected to the processing described in (ii) are sequentially encoded into run-length codes.

(iv) In a case where information of the adjoining fundamental picture elements has been changed from white to black or vice versa, the position of the information change elemental picture element in the picture element block between the adjacent fundamental picture elements (these elemental picture elements will hereinafter be referred to as the elemental picture element (1)) is encoded using, for example, the distance between the information change elemental picture element and the fundamental picture element immediately preceding it.

The above coding algorithm (II) exhibits the following advantages.

(1) The transmission efficiency is further enhanced.

(2) Since the elemental picture element (2) is processed as elemental picture element (1), the number of fixed length codes used increases, resulting in the influence of the transmission error being further alleviated.

(3) An encoder and a decoder can be simplified in circuit construction.

In the above coding algorithm, when the number of elemental picture elements having more than two change points is small and the change point lies substantially at the center of each elemental picture element, as shown in 6, 7, 17 and 18 in FIG. 3, processing can be performed regarding that no change exists. This can be regarded as a coding algorithm (III).

With reference to the drawings, the following will describe embodiments for carrying this invention into practice on the basis of the above principles.

FIG. 4A illustrates an embodiment of a coding method of this invention. Reference numeral 100 indicates a facsimile signal input terminal; 10 designates a clock pulse generator; 20 identifies a memory for storing signals of one line; 31 and 32 denote change picture element detectors; 41, 42, 43, 44 and 45 represent counters; 51, 52, 53 and 54 show coders; 61, 62 and 63 refer to gates; 64 and 66 indicate AND circuits; 65 designates an AND circuit having a NOT input; 71 and 72 identify 5-bit registers; 81, 82, 83 and 84 denote buffer memories; 90 represent a signal combiner; and 110 shows an output terminal.

Next, a detailed description will be given of the construction and operation of this embodiment. The facsimile signals to be encoded are applied from the input terminal 100 to the memory 20 for storage therein for each line. The contents of the line memory 20 are successively read out into the 5-bit shift register 71, the output of which is applied via the gate 61 to the change picture element detector 32.

The gate 61 is opened, every four bits, by the output $P_4$ from the 4-bit counter 43 to which is applied the output from the clock pulse generator 10; consequently, fundamental picture elements are derived, every four picture elements, from a signal to the change picture element detector 32.

Figure 4B:
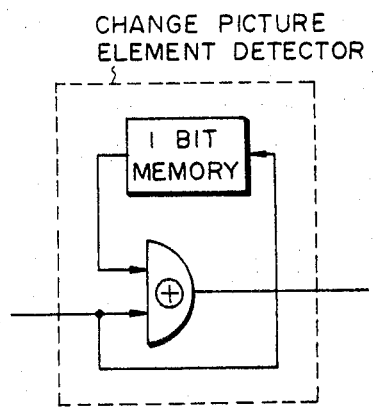
FIG. 4B is a block diagram showing an example of a change picture element detector used in FIG. 4A.

The change point of the fundamental picture element is detected by making a comparison between the fundamental picture element read via gate 61 and the immediately preceding fundamental picture element by means of the change picture element detector 32 which is composed of an exclusive OR circuit and a 1-bit memory, as shown in FIG. 4B. Upon detection of the change point, the change picture element detector provides an output "1" to the counter 44.

The counter 44 counts the output from the change picture element detector, and the counter output is encoded by the coder 51 into a run-length code. In this case, the white run and the black run are encoded with the $B_1$ code and the 1, 2, 3, $4B_1$ code respectively and alternately with each other, as described above. The coded output from the coder 51 is applied to the buffer memory 81.

Namely, in the example of the facsimile signal line shown in FIG. 2, white 3, black 4, white 2, black 3 and white 1 which are the fundamental picture elements are encoded into "1000 1100 01 110 00" and stored in the buffer memory 81.

Next, the output from the memory 20 is applied to the change picture element detector 31, whose output is added to the contents of the counters 41 and 42. These counters 41 and 42 are reset by a $P_4$ output "1" from the 4-bit counter 43 corresponding to the fundamental picture element. When a change point is detected in the elemental picture element by the change picture element detector 31, the abovesaid addition is stopped by the detection output, so that the counter 41 produces "1" at its output terminal 41-1 or 41-2 in dependence on whether the number of change points is "1" or more than "2".

In a case where "1" is derived at the output terminal 41-2, this output "1" is applied to bit elements (1) and (5) of the 5-bit shift register 71 so that when the elemental picture element includes more than two change points, the operation is performed for changing the fundamental picture elements on both sides of the picture element block to black following the aforementioned Coding Algorithm (I).

The outputs of the bit elements (1) and (5) of the 5-bit shift register 71 and the $P_4$ output of the 4-bit counter 43 are both provided to the AND circuit 64, and when they are both "1", that is, when adjacent fundamental picture elements are both black, the AND circuit 64 yields an output "1", which is applied to the AND circuits 65 and 66. On the other hand, the output 41-2 of the counter 41 is supplied to the AND circuit 65 having a NOT input and, at the same time, to the AND circuit 66. As a consequence, in a case where the adjoining fundamental picture elements are both black and the picture element block sandwiched therebetween does not have the elemental picture element (2), the output 41-2 of the counter 41 is "0", so that the output "1" of the AND circuit 65 is applied to the counter 45 for successively counting the number of black picture elements in the black-black picture element block sandwiched between the black fundamental picture elements. In a case where the output 41-2 from the counter 41 is "1", that is, in a case of the elemental picture element (2) being included in the picture element block, the output from the AND circuit 65 with a NOT circuit is "0", and the output from the AND circuit 66 becomes "1", and this signal is applied to the counter 45 to stop the counting operation thereof. As a result of this, the count value of the counter 45 represents which of the picture elements of the black-black picture element block lying between the black picture elements is the elemental picture element (2).

This value is encoded by the coder 52 using the $B_1$ code; in the example of the facsimile signal shown in FIG. 2, second and third picture elements are stored in the buffer memory 82. On the other hand, the 5-bit shift register 72 reads the content of the memory 20 as is the case with the 5-bit shift register 71, but since the gate 62 is opened only when the output 41-2 from the counter 41 is "1", the original information in the case of the elemental picture element (2) is directly fed to the encoder 53 and encoded, thereafter being stored in the buffer memory 83.

This coding may follow the pattern of the 5-bit original information, or since there are twenty-two kinds of black-white arrangements for the elemental picture element, it is also possible to perform coding corresponding to a desired one of such arrangements.

To the counter 42 are applied clock pulses from the clock pulse generator 10 for counting, and the counter 42 is reset by the output $P_4$ of the 4-bit counter 43 as described previously. When a change picture element is detected by the change picture element detector 31, the counting is stopped, so that the distance between the information change elemental picture element and the fundamental picture element just before it is counted by the counter 42. The output from the counter 42 is applied via the gate 63 to the encoder 54, but since the gate 63 is opened by the output 41-1 from the counter 41 being "1", the signal encoded by the coder 54 is the elemental picture element (1) which corresponds to the distance between the fundamental picture element and the information change elemental picture element in the case where adjacent fundamental picture elements are white and black or black and white respectively. This coding uses the 2-bit fixed length code of Table 1(C), as mentioned previously. In the example of the facsimile signal shown in FIG. 2, encoded outputs are "10", "01", "10", "10" and are stored in the buffer 84.

The outputs from the abovesaid buffer memories 81, 82, 83 and 84 are combined by the signal combiner 90 into a composite signal that the fundamental picture element, the elemental picture element (2), and the elemental picture element (1) are arranged in this order, and the composite signal is sent out of the output terminal 110. (See the lower part of FIG. 2.)

The above is the operation of the coding device of FIG. 4A, and decoding takes place in the reverse order of coding.

Figure 5:
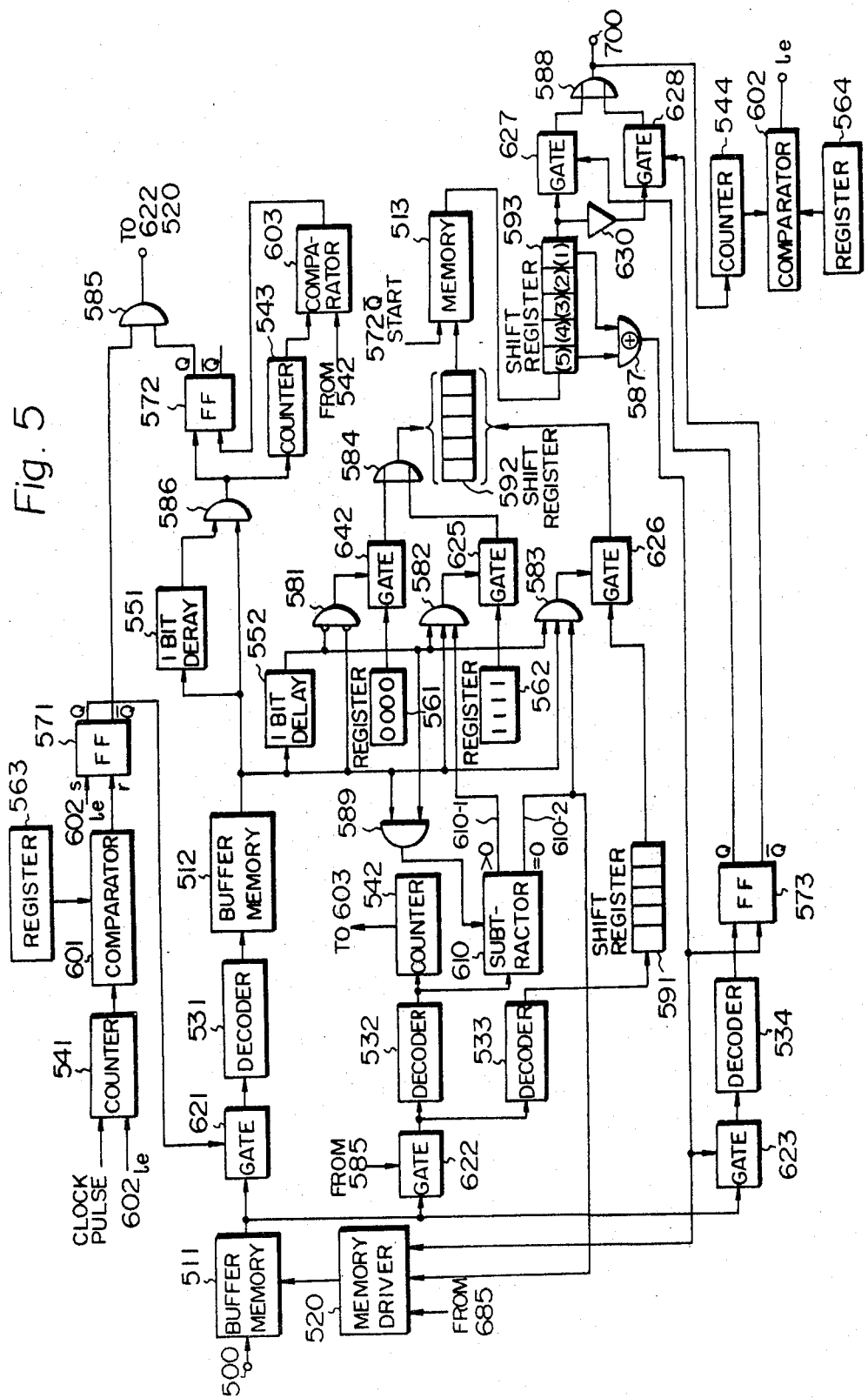
FIG. 5 is a block diagram showing an example of coded facsimile signal decoding device according to the embodiment of FIG. 4A.

FIG. 5 illustrates an example of decoding device corresponding to the coding device of FIG. 4A. In FIG. 5, reference numeral 500 indicates an input terminal; 511 and 512 designated buffer memories; 513 identifies a memory for storing picture elements of one line; 520 denotes a memory drive circuit; 531, 532, 533 and 534 represent decoders; 541, 542, 543 and 544 show counters; 551 and 552 refer to 1-bit delay circuits; 561 and 562 indicate registers; 563 designate a register for storing the number of fundamental picture elements of one line; 564 identifies a register for storing the number of picture elements of one line; 571, 572 and 573 denote flip-flops; 581 represents a NOR circuit; 582, 583, 585, 586 and 589 show AND circuits; 584 and 588 refer to OR circuits; 587 indicates an exclusive OR circuit (EOR circuit); 591, 592 and 593 designate shift registers; 601, 602 and 603 identify comparators; 610 denotes a subtractor; 621, 622, 723, 624, 625, 626, 627 and 628 represent gate circuits; 630 shows a NOT circuit; and 700 refers to an output terminal.

The operation of the decoding device of FIG. 5 is as follows: The coded signal from the input terminal 500 is once loaded in the buffer memory 511. This signal is applied via the gate 621 to the decoder 531 for decoding, and the decoded signal is provided to the buffer memory 512, but in this case, signals of only fundamental picture elements are stored in the buffer memory, as will be described hereunder. To the counter 541 are applied clock pulses and a one-line end signal le from the comparator 602 described later, and the output of this counter is applied to the comparator 601 for comparison with the content of the register 563 having stored therein the number of fundamental picture elements of one line. In a case where one line includes, for example, 1728 picture elements and N=4, 433 is stored as the number of fundamental picture elements. The comparator output is supplied to the flip-flop 571 to reset it.

That is, this circuit structure is to detect whether the signal is the fundamental picture element or not. By the output Q from the flip-flop 571 (To its set terminal is applied the signal le from the comparator 602.) being "1" or "0", the gate 621 is opened and closed; consequently, the decoder 531 decodes only the fundamental picture elements. In a case of decoding the coded facsimile signal of FIG. 2, "000111001110" is stored in the buffer memory 512.

The output read from the buffer memory 512 and the output from the 1-bit delay circuit 551 are both applied to the AND circuit 586, and when they are both "1", that is, when adjacent fundamental picture elements are both black, the AND circuit 586 yields an output "1", and the number of black-black picture element blocks in one line is counted by the counter 543.

The count value of the counter 543 is compared by the comparator 603 with the count value of the counter 542 representing the order of the black-black picture element blocks, and the flip-flop 572 operates to derive an output "1" from the AND circuit 585 until the abovesaid two count values become equal.

Thus, when the output from the AND circuit 585 is "1", the gate 622 is opened to apply therethrough the signal from the buffer memory 511 to the decoder 532. The decoder 532 decodes a suitable one of the black-black picture element block and sets the decoded value in the subtractor 610 and, at the same time, applies the value to the counter 542 for addition.

On the other hand, the signal read from the buffer memory 512 and the output signal from the 1-bit delay circuit 552, which is produced by passing therethrough the abovesaid signal, are provided to the AND circuit 589. When the both inputs are "1", that is, in a case of the black-black picture element block that the fundamental picture elements on both sides thereof are black, the AND circuit 589 produces an output "1", which is supplied to the subtractor 610. Accordingly, if the signal applied to the subtractor 610 from the decoder 532 is "2", the output 610-1 from the subtractor 610 representing (>0) in response to a first "1" of the output from the AND circuit 589. This is applied to the AND circuit 582, but this AND circuit has applied thereto the signal read from the buffer memory 512 and its delayed signal from the 1-bit delay circuit 552, so that when all the inputs are "1", the AND circuit 582 produces "1". This indicates that the adjacent fundamental picture elements are both black, that no transition points exist between them, and that the elemental picture elements are all black. As a consequence, by the output "1" from the AND circuit 582, the gate 625 is opened, through which "1111" stored in the register 562 is provided to the OR circuit 584.

Where the signal read from the buffer memory 512 and its delayed signal from the 1-bit delay circuit 552 are both "0", the adjacent fundamental picture elements are both white. At this time, these inputs are applied to the NOR circuit 581 to provide therefrom an output "1", which is supplied to the gate 624 to open it, with the result that "0000" stored in the register 561 is read out thereof to be supplied to the OR circuit 584.

In this manner, to the OR circuit 584 are provided the signal "0000" via the gate 624 and the signal "1111" via the gate 625 in the order of decoding of the fundamental picture elements, and the output from the OR circuit 584 is stored as a 5-bit signal in the shift register 592.

Turning back to the foregoing, when the output from the AND circuit 589 applies a second "1" to the subtractor 610, the output 610-2 from the subtractor 610 representing (=0) becomes "1". This output is applied to the AND circuit 583, but, to this AND circuit 583 are applied the signal read from the buffer memory 512 and its delayed signal from the 1-bit delay circuit 552, as is the case with the AND circuit 582, so that these inputs being all "1" means that the adjoining fundamental picture elements are both black and that tne elemental picture element (2) exists between them. Consequently, by the output "1" from the AND circuit 583, the gate 626 is opened to pass on the signal stored in the shift register 591 to the shift register 592.

When the output 610-2 from the subtractor 610 representing (=0) is "1", it is applied to the memory drive circuit 520, and the signal from the buffer memory 511 is applied via the gate 622 to the decoder 533 and decoded thereby to the original signal, thereafter being stored as a 5-bit signal in the shift register 591. This 5-bit signal, for example, the original information "11011" of the second elemental picture element (2) is stored by the above operation in the shift register 592.

Thereafter, as is the case with the above, immediately when "3" decoded by the decoder 532 enters the comparator 610, the AND circuit 589 supplies the output "1" to the subtractor 610 for each black-black picture element block. Until the subtractor output (=0) becomes "1", the gate 625 is opened by "1" of the output (>0) as in the above, permitting application of "1111" to the OR circuit 584. When the output from the AND circuit 589 becomes "3", the output (=0) from the subtractor 610 becomes "1", and "00110" decoded by the decoder 533 is provided via the gate 626 to the shift register 592 at the corresponding position.

Next, when the outputs from the counters 542 and 543 are detected to be equal by the comparator 603, the output status of the flip-flop 572 is inverted to make its output Q to the AND circuit 585 "0" and close the gate 622, and at the same time, the memory 513 starts with $\bar{Q}$="1" and stores the signal stored in the shift register 592. This signal is read out into the shift register 593, and the adjoining fundamental picture elements which are first and fifth bit signals are applied to the EOR circuit 587. When these signals are "1" and "0" or "0" and "1" (when the adjacent fundamental picture elements are black and white or vice versa), the EOR circuit 587 yields an output "1", which is applied to the gate 623 to open it, through which the signal read from the buffer memory 511 are provided to the decoder 534 for decoding.

This decoded signal corresponds to the elemental picture element (1), and at the position of transition of the elemental picture element, a pulse is outputted. For example, if the signal changes at a position "3" in the decoder 534, then the outputs Q and $\bar{Q}$ from the flip-flop 573 respectively become "0" and "1" at this moment, closing the gate 627 and opening the gate 628.

On the other hand, the signal stored in the shift register 593 is directly applied to the gate 627 or via the NOT circuit 630 to the gate circuit 628, but since the NOT circuit 630 is to invert the signal from "1" to "0" or "0" to "1", the signal of the shift register 593 is rendered by closing and opening of the gates 627 and 628 into correct white-black or black-white signal, thereafter being applied to the OR circuit 588.

That is, in the coded signal shown in FIG. 2, the first signal of the elemental picture element (1) is "3", so that the signal inverted by the NOT circuit 630 passes through the gate 628 after three picture elements; before this, non-inverted signal read out of the shift register 593 is applied to the OR circuit 588, so that the picture elements of the coded facsimile signal are all decoded and derived at the output terminal 700.

At the same time, the output from the OR circuit 588 is applied to the counter 544 for counting these picture elements, and the count value of the counter is always compared by the comparator 602 with the output from the register 564 for storing the number of picture elements of one line. For example, when the counter output reaches the number of picture elements of one line 1728, the 1-line end signal le is derived from the comparator 602 and applied to the counter 541 and the flip-flop 571, starting the decoding operation for a new scanning line.

The above has described an embodiment of each of the coding method of this invention corresponding to the aforementioned coding algorithm (I) together with the decoding method; the following will describe an embodiment following the coding algorithm (II).

Figure 6:
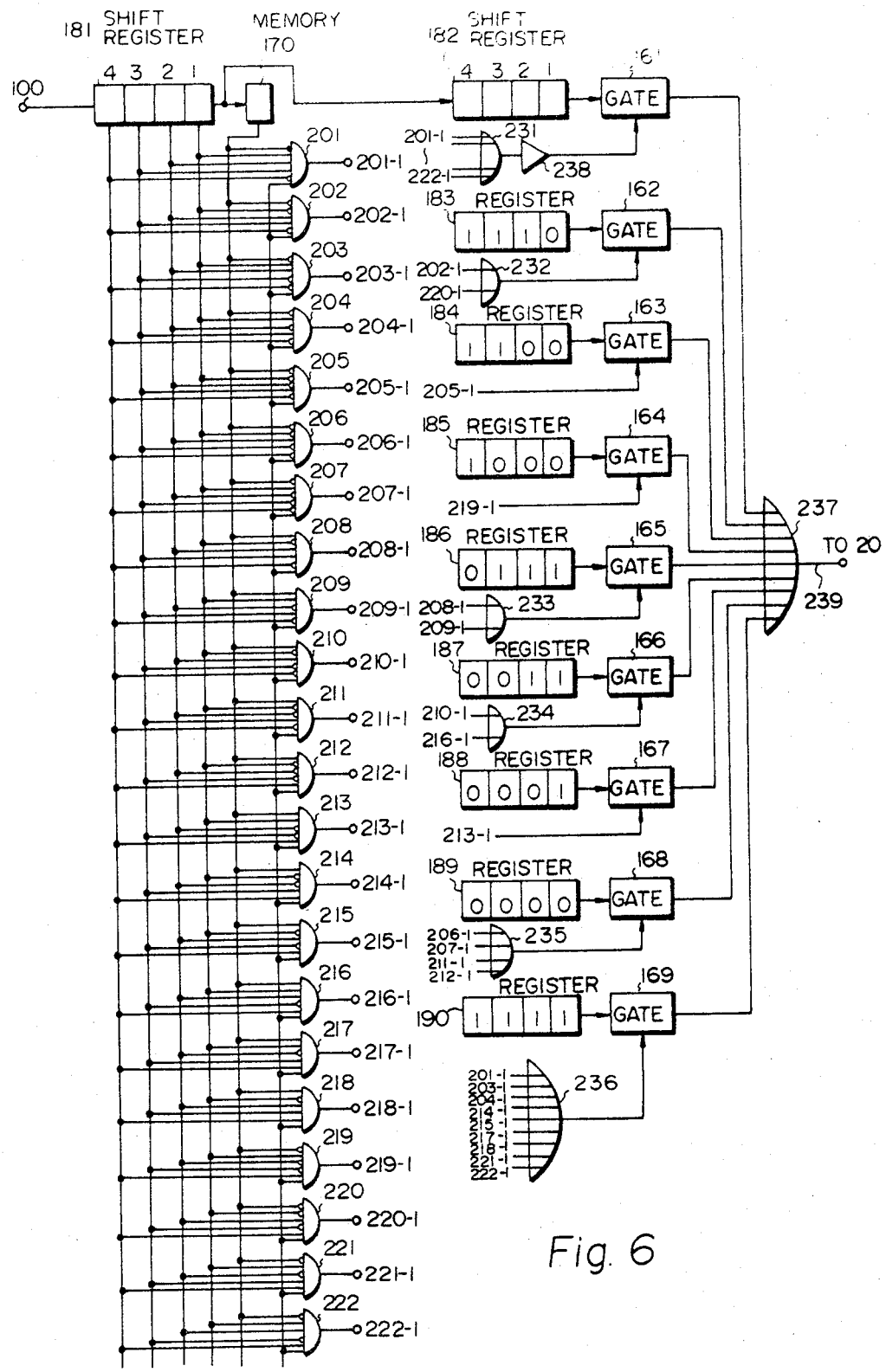
FIG. 6 is a block diagram showing a signal converter section in a case of using the signal conversion of FIG. 3.

FIG. 6 illustrates in block form a signal converter section used in this case. Reference numeral 100 indicates a facsimile signal input terminal; 161 to 169 designate gates; 170 identifies a memory; 181 and 182 denote shift registers; 183 to 190 represent registers; 201 to 222 show AND circuits with NOT inputs; 201-1 to 222-1 refer to output terminals of the AND circuits 201 to 222; 231 to 237 indicate OR circuits; 238 designates a NOT circuit; and 239 identifies an output terminal.

This signal converter section is inserted between the input terminal 100 and the line memory 20 in FIG. 4A. The operation of this embodiment will hereinbelow be described. The facsimile signal to be encoded is applied first to the shift register 181 from the input terminal 100. By this signal and the memory 170, the immediately preceding fundamental picture element (0) and four picture elements (1, 2, 3, 4) of the corresponding picture element block are collated in the AND circuits 201 to 222. When a pattern corresponding to any one of these shown in the converted signal diagrams 1 to 22 of FIG. 3 appears, the AND circuit corresponding to the pattern produces an output.

This output opens any one of the gates 161 to 169 directly or via the OR circuits 231 to 236, and any one of eight kinds of signal patterns stored in the registers 183 to 190 is applied via the opened gate and the OR circuit 237 to the output terminal 239.

Where no output is derived from any one of the AND circuits 201 to 222 (when more than "2" transitions exist in the elemental picture element of the block), the output from the OR circuit 231 is "0". This output is applied to the NOT circuit 238 to invert its output, which is applied to the gate 161; thus the original signal stored in the shift register 182 is supplied via the OR circuit 237 to the line memory 20 in FIG. 4(A).

The encoding operation after the above signal conversion is exactly the same as that of the coding apparatus described previously with regard to FIG. 4A.

The decoding device in this case can be obtained with the circuit of FIG. 5.

For execution of the aforementioned coding algorithm (III), use is made of such a circuit as shown in FIG. 7 in which gates 703 and 705, the circuit of FIG. 6 and an OR circuit 706 are disposed between the input terminal 100 and the memory 20 in FIG. 4A and in which a flip-flop 702 is set by the output from a specific pattern detector 701 for detecting the patterns 6, 7, 16 and 17 in FIG. 3 to open the gate 705, thereby to permit desired conversion with the circuit of FIG. 6. When no specific pattern is detected, the input is applied as it is to the memory via the gate 703. The specific pattern detector 701 can be composed of a register for storing a specific pattern and a comparator.

Also in this case, the decoding device of FIG. 5 is utilized.

As has been described above in detail, the present invention permits reduction of the transmission time and substantial alleviation of the influence of the transmission error; therefore, the invention is of great utility in practice.

In the following, this invention will be described for two dimensional coding.

FIG. 8A shows an example of a facsimile signal. In the present invention, the facsimile signal is divided into fundamental picture elements positioned every N picture elements (In FIG. 8A, N is 4 but may also be other integers.) in the scanning line direction and elemental picture elements lying between the fundamental picture elements. In FIG. 8A black-dotted sections indicate the fundamental picture elements, and unhatched frames indicate white picture elements and hatched ones black picture elements.

A picture element block which has more than two transition points of black-and-white information in the elemental picture elements between adjacent fundamental picture elements will hereinafter be referred to as the elemental picture element (2), and a picture element block having one such transition point will be referred to as the elemental picture element (1).

The same scanning line as the information change picture element to be encoded will hereinafter be referred to as the coding line, and the scanning line immediately preceding the coding line will be referred to as the preceding line.

Since the present invention is an expansion of the aforementioned one-dimensional facsimile signal coding method to a two dimensional coding method, as mentioned above, a description will be given first of the coding procedure in the above invention.

Coding Algorithm (i) In a facsimile signal of one line, fundamental picture elements are determined every N picture elements (N=a positive integer) in the scanning line direction, and picture elements lying between adjacent ones of the fundamental picture elements are defined as elemental picture elements.

(ii) In a picture element block in which two or more information change picture elements, each having information changed from that of the picture element immediately preceding it, are included in the elemental picture elements lying between adjacent ones of the fundamental picture elements (this block is called the elemental picture element (2)) is subjected to pre-processing in which the fundamental picture elements on both sides of the block are once rendered black.

(iii) Successive white or black fundamental picture elements in the signal train subjected to the pre-processing described in (ii) are sequentially encoded into run length codes.

(iv) For the picture element block of the elemental picture element (2) of black-black picture element block in which two or more black fundamental picture elements occurring in succession, the position of the picture element block and its original information before pre-processing are encoded.

(v) The position of an information change picture element in the picture element block in which adjacent ones of the fundamental picture elements each have information changed from white to black or vice versa (this block is called the elemental picture element (1)) is encoded using, for example, the distance between the information change picture element and the fundamental picture element immediately preceding (or succeeding) it.

In the above-mentioned method which performs coding in the above procedure, the facsimile signal is divided into fundamental picture elements and elemental picture elements, and they are respectively subdivided into those elements which are successively encoded and those which are encoded locally. By mainly employing fixed length codes for the latter coding, high-efficiency coding can be achieved and the influence of the transmission error can be lessened.

Since the two dimensional coding method of this invention is an expansion of the abovesaid one-dimensional coding method of this invention to the two-dimensional system, the coding of the fundamental picture element train mentioned in (iii) of the above-mentioned algorithm is modified to be performed using information of the preceding line.

According to the two dimensional coding principle, in this coding of the fundamental picture element, its information is compared with information of the directly preceding scanning line at the corresponding position to check whether the both information are identical with (hereinafter referred to as the "hit") or different from (hereinafter referred to as the "miss") each other, and the numbers of "hits" and "miss" are encoded into run-length codes.

To perform this, the states of the fundamental picture elements of the coding line are divided into "0", "1" and "2" in dependence on whether the fundamental picture elements of the line immediately preceding the coding line are each white or black. In other words, when the fundamental picture element of the preceding line is white, the corresponding fundamental picture element of the coding line is defined to be in the state "0"; when the fundamental picture element of the preceding line is black, the corresponding picture element of the coding line is defined to be in the state "1"; and when an information transition occurs between the adjoining fundamental picture elements of the preceding line, the corresponding fundamental picture element of the coding line is defined to be in the state "2" regardless of the abovesaid states "0" and "1".

With such definition of the states of the fundamental picture elements, white or black of the fundamental picture element in the state "0" or "1" on the preceding line is very likely to be white or black at the same position on the next line. (If this prediction proves right, then it is the "hit", and if not, it is the "miss".) The state "2" means an information change between the adjacent fundamental picture elements and indicates that the change is likely to occur on the next line; therefore, this is difficult for prediction and unstable. By dividing the picture elements into the picture element block easy to predict and the picture element block difficult to predict, as described above, the coding efficiency is further enhanced.

Next, coding of the fundamental picture element train will concretely be described with respect to the example of facsimile signal shown in FIG. 8A.

The state of the preceding line is defined such that the line is in the state "0" or "1" in dependence on whether the fundamental picture element is white or black, and that if an information transition point exists in the elemental picture element in the above line state, the fundamental picture elements on both sides of the fundamental picture element are put in the state "2", as described above. This is such as shown in the column "State" between the preceding and the coding line in FIG. 8A.

Next, the fundamental picture element of the coding line is compared with the fundamental picture element of the preceding line at the same position; this comparison is performed for each of the states "0", "1" and "2". If they are the same, it is the "hit", and if not, it is the "miss". If the coding line includes a picture element block which must be pre-processed by the coding algorithm (ii) of the prior invention, the pre-processing is performed prior to the comparison.

In the example of FIG. 8A, the fundamental picture elements of the state "0" are 1st, 8th, 12th and 13th ones; the 1st and 8th fundamental picture elements are "hit", the 12th one is "miss", and the 13th one is "hit", thus resulting in "hit" 2, "miss" 1 and "hit" 1. Then, these "hit" and "miss" are encoded.

The "hit" is encoded using Table 1(A) generally known as B₁ codes, and the "miss" is encoded using encoding codes of Table 1(B) (hereinafter referred to as the 1.2.3.4 B₁ code) devised by the present inventors. The abovesaid fundamental picture element train is encoded as follows:

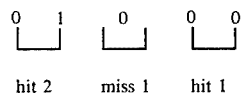

hit 2   miss 1   hit 1

As for the state "1", 4th and 5th fundamental picture elements are "hit", and "hit" 2 is encoded into

The fundamental picture elements of the state "2" are 2nd, 3rd, 6th, 7th, 9th, 10th and 11th ones; the 2nd, 3rd, 6th and 7th fundamental picture elements are "hit", the 9th one is "miss", the 10th one is "hit", and the 11th one is "miss". This fundamental picture element train is encoded as follows:

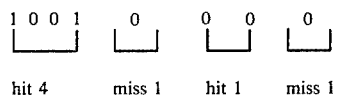

hit 4   miss 1   hit 1   miss 1

Accordingly, the fundamental picture elements are encoded as follows:

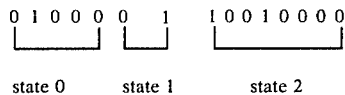

state 0   state 1   state 2

Next, the position of that one of black-black picture element blocks sandwiched between adjacent black fundamental picture elements on the coding line which has more than two changes in the elemental picture elements (the elemental picture element (2)) is encoded using the B₁ code of Table 1(A), and the original information of this elemental picture element is encoded.

In the example of FIG. 8A, there are six black-black picture element blocks sandwiched between black fundamental picture elements, i.e. 3–4, 4–5, 5–6, 9–10, 10–11 and 11–12, and two elemental picture elements (2), i.e. 4–5 and 11–12.

The block 4–5 is a second one of the six blocks, so that it is encoded into

and coding for representing the original information of this block is effected to obtain

The block 11–12 is fourth from the block 5–6, and this is encoded into

and coding for representing the original information of this block is performed to obtain

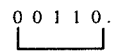

Thus, coding of the elemental picture element (2) is completed, and the position of the elemental picture element (in a case of one change point, the elemental picture element (1)) of the picture element block sandwiched between adjacent fundamental picture elements having their information changed from white to black or vice versa is encoded into a fixed length code using, for example, the distance from the immediately preceding fundamental picture element.

In the example of FIG. 8A, N=4, so that this encoding code is a 2-bit fixed code, such as shown in Table 1(C). The picture element blocks corresponding to this elemental picture element (1) are those 2–3, 6 0 7, 8–9 and 10–11, and the positions of their respective transitions are spaced distances 3, 2, 3 and 3 apart from the immediately preceding picture elements. These distance are encoded as follows:

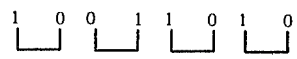

The picture elements encoded by the above method are arranged in the order fundamental picture element-elemental picture element (2)-elemental picture element (1) and become such an encoded signal output as shown in FIG. 8B.

In the above, the B₁ code and the 1.2.3.3 B₁ code are used as encoding codes for the "hit" and the "miss" respectively, but the B₁ code may also be used equally for both of them, or some other encoding codes may be employed.

In the practice of this invention, a first fundamental picture element of each line is encoded as the "hit" regardless of its state being "0", "1" or "2", although this does not limit the essence of the invention.

In the foregoing, in a case of the elemental picture element (2), pre-processing of making black the fundamental picture elements on both sides thereof is performed first, and then encoding of the fundamental picture element train is carried out. It is also possible, however, to convert the elemental picture element (2) to the elemental picture element (1) so that only the fundamental picture element and the elemental picture element (1) are encoded; accordingly, this invention is not limited specifically to the above-described method.

Next, the coding procedures will briefly be enumerated to facilitate a better understanding of the coding method described in the foregoing.

(i) In a facsimile signal of one line, fundamental picture elements are selected every N picture elements in the scanning line direction, and the other picture elements.

(ii) The fundamental picture elements of the coding line are each classified into one of three kinds of states "0", "1" and "2" in dependence upon whether the corresponding fundamental picture element of the preceding line is white or black.

(iii) The elemental picture element (2) of the coding line is subjected to the pre-processing that the fundamental picture elements on both sides are made black.

(iv) The series of pre-processed fundamental picture elements is compared with the series of fundamental picture elements of the preceding line for each state, and the "hit" and the "miss" are encoded into run length codes.

(v) The position of the picture element block including the elemental picture element (2) and the original information of the picture element block before processing are encoded.

(vi) The position of the elemental picture element (1) is encoded into a fixed length code using, for example the distance between this elemental picture element and the fundamental picture element immediately preceding it.

In the method of the aforementioned embodiment of this invention which performs coding in the above procedure, the facsimile signal is divided into fundamental picture elements and elemental picture lements, and they are respectively subdivided into those elements which are successively encoded and those which are encoded locally. By mainly employing fixed length codes for the latter coding, high-efficiency coding can be achieved and the influence of the transmission error can be lessened.

For the compression efficiency, Table 3 shows, in respect of the system of this invention and the typical prior art method, i.e. MH system (Modified Huffmann System), the transmission times (in second) in terms of resolution ($8 \times 4$ picture elements/mm$^2$) converted into 4800 bps in cases of using A4-size test documents approved by CCITT SG XIV (facsimile). In the table, numerical values in parantheses each represent in % the rate of a signal in which two picture elements at most are inverted by a bit error.

The value of K, which will be described in detail later on, means that a one-dimensional system is applied every K lines for confining the influence of the transmission error within K lines at most.

coding line are each rendered into the same information as that on the preceding line, or information inverted therefrom by decoding the "hit" and "miss" of the state of each fundamental picture element. As a result of this, if adjacent ones of the fundamental picture elements are both white, the elemental picture elements therebetween are all decoded as being white, whereas if the fundamental picture elements are both black, all the elemental picture elements therebetween are decoded as being black or after being restored to their original information in dependence on whether the picture element block has no or more than two change points (the elemental picture element (2)).

In a case where the fundamental picture element has information changed from white to black or vice versa, the code corresponding to the distance from the fundamental picture element to the change point is decoded. Since the elemental picture element (1) having one change point is encoded into a fixed length code, an error in this part merely causes reversal of two picture elements at most and does not extend to the succeeding picture elements, exerting substantially no influence on the received picture quality.

On the other hand, variable length codes are employed for the abovesaid fundamental picture elements and the elemental picture elements (2), the influence of the transmission error is substantially the same as in the prior art system. Accordingly, the system of this invention lessens the influence of the transmission error by the rate of the number of bits of the elemental picture element (1) insusceptible to this error to the number of all bits being coded. This rate is about 30% (K=2)~40% (K=∞), as indicated by the numerical value in the parentheses in Table 3, resulting in the bit error rate being equivalently reduced about 33% when K=2 and about 30% when K=4. In the prior invention, K=1 and the bit error rate is reduced about 28%.

With reference to the drawings, the following will describe an example of apparatus for carrying this invention into practice on the basis of the principles described above.

TABLE 3

| | | | | | No. 5 French | | | |
| | | No. 1 | No. 2 | | No. 4 | Sentence | | No. 7 | |
| | | Letter in | Electronic | No. 3 | French | with illust- | No. 6 | Japanese | No. 8 |
| System | | English | circuit | Slip | sentence | rations | Graph | sentence | Memo |
| MH system | | 27.7 | 25.8 | 50.8 | 90.9 | 52.8 | 39.9 | 89.2 | 49.6 |
| Prior application by present inventors | | 24.2 | 22.6 | 46.7 | 85.2 | 50.1 | 36.9 | 89.4 | 43.5 |
| | | (33.7) | (22.6) | (28.8) | (37.4) | (30.5) | (24.3) | (26.5) | (22.5) |
| | | 22.2 | 17.8 | 40.1 | 80.1 | 44.0 | 29.3 | 81.4 | 32.8 |
| | K = 2 | | | | | | | | |
| | | (36.8) | (28.8) | (33.5) | (39.8) | (34.8) | (30.6) | (29.0) | (29.9) |
| System of this | K = 4 | 21.2 | 15.4 | 36.9 | 77.5 | 40.9 | 25.5 | 77.5 | 27.4 |
| invention | | (38.5) | (33.3) | (36.4) | (41.1) | (37.4) | (35.2) | (30.5) | (35.8) |
| | | 20.2 | 13.0 | 33.6 | 75.0 | 37.8 | 21.7 | 73.5 | 22.0 |
| | K = ∞ | | | | | | | | |
| | | (40.4 | (39.4) | (40.0 | (42.5) | (40.5) | (41.4) | (32.3) | (44.6)) |

The transmission time by the method of this invention could be reduced about 19% when K=2 and about 25% when K=4, as compared with the MH system. With the prior application, the transmission time was reduced about 7%.

Figure 9:
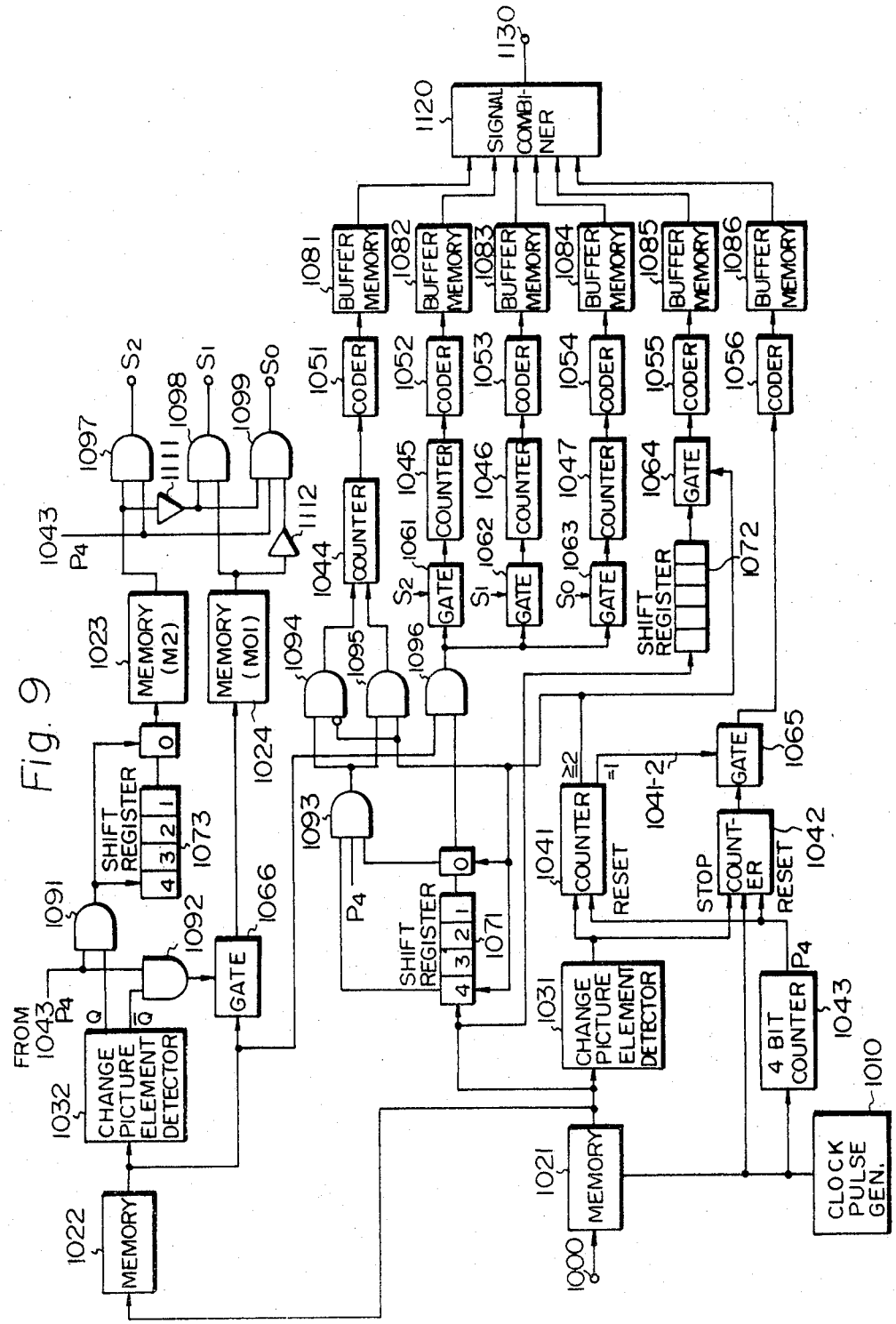
FIG. 9 is a block diagram illustrating an embodiment of this invention, and FIGS. 10A and 10B jointly illustrate a block diagram showing an example of decoding device for a facsimile signal encoded by the embodiment of FIG. 9.

The facsimile signal encoded by the procedure described above can be decoded in the reverse order of encoding. The fundamental picture elements of a de- FIG. 9 shows, by way of example, a coding device embodying this invention. Reference numeral 1100 indicates a facsimile signal input terminal; 1010 designates a clock pulse generator; 1021, 1022, 1023 and 1024 identify memories; 1031 and 1032 denote change picture element detectors; 1041, 1042, 1043, 1044, 1045, 1046 and 1047 represent counters; 1051, 1052, 1053, 1054, 1055 and 1056 show coders; 1061, 1062, 1063, 1064, 1065 and 1066 refer to gates; 1071, 1072 and 1073 indicate shift registers; 1081, 1082, 1083, 1084, 1085 and 1086 identify buffer memories; 1091, 1092, 1093, 1095, 1097, 1098 and 1099 denote AND circuits; 1094 represents an AND circuit with a NOT input; 1096 shows an exclusive OR circuit (EOR circuit); 1111 and 1112 refer to NOT circuits; 1120 indicates a signal combiner; and 1130 designates an output terminal. The change picture element detectors 1031 and 1032 can each be constituted, for example, by obtaining Exclusive OR of the input and an output delayed by one bit with respect to the input.

Next, a detailed description will be given of the construction and operation of this embodiment. The facsimile signal to be encoded is applied from the input terminal 1100 to the line memory 1021 for storage.

The memory 1022 has stored therein information of the immediately preceding scanning line (that is, the preceding line) applied from the memory 1021 of one line. At first, the states of fundamental picture elements must be determined, and this is determined according to the information of the preceding line. The contents of the memory 1022 are supplied to the change picture element detector 1032 on a bit-by-bit basis. If a change picture element is detected, the output Q of the change picture element detector 1032 becomes "1", but if not detected, its output $\bar{Q}$ becomes "1".

Generally, the detector 1032 is reset to $\bar{Q}$ at the moment of its start and detects whether or not a change picture element exists between one fundamental picture element in the state of no change and the next fundamental picture element. In case of no change point, the output from the AND circuit 1092 is made "1" by the abovesaid output $\bar{Q}$ and the output $P_4$ (which coincides with the timing of the fundamental picture element) from the 4-bit counter 1043 to which is provided the output from the clock pulse generator 10.

The output of the above AND circuit 1092 opens the gate 1066 to pass on information at that time from the memory 1022 to the memory 1024. This is the fundamental picture element of the state "0" or "1".

When a change point is detected by the change picture element detector 1032, its output Q becomes "1", and this output and the output $P_4$ causes the AND circuit 1091 to provide an output "1"; as a consequence, 0th and 4th bits (fundamental picture elements) of the shift register 1073 become "1". This content is applied to the memory 1023.

The memory 1023 is to store the fundamental picture element of the state "2". If the 0th and 4th bits of the shift register 1073 are "1", the picture element is the fundamental one of the state "2".

Accordingly, if the fundamental picture element stored in the memory 1023 is "0", and if the fundamental picture element in the memory 1024 is also "0", the fundamental picture element is classified into the state "0", and if the fundamental picture element in the memory 1024 is "1", it is classified into the state "1".

The outputs from these memories 1023 and 1024 are applied directly or via the NOT circuits 1111 and 1112 to the AND circuits 1097, 1098 and 1099 together with the output $P_4$, deriving signals $S_0$, $S_1$ and $S_2$ respectively corresponding to the states "0", "1" and "2". These outputs are used for controlling the gates 1061, 1062 and 1063.

Thus, the state of the fundamental picture element of the preceding line can be identified.

Next, the content of the memory 1021 of one line is supplied to the change picture element detector 1031, whose output is applied to the counters 1041 and 1042. These counters 1041 and 1042 are reset by "1" of the output $P_4$ from the 4-bit counter 1043 which corresponds to the fundamental picture element, and when a change point in the elemental picture element is detected by the change picture element detector 1031, the abovesaid counters are stopped from counting by its output; therefore, the counter 1041 produces "1" at its output terminal 1041-1 or 1041-2 in dependence on whether the number of change points detected is one or more than 2.

When "1" is derived at the terminal 1041-2, the number of the information change points in the elemental picture elements of the picture element block is more than 2, and in order to change to black the fundamental picture elements on both sides of the picture element block, the output "1" at the terminal 1041-2 is applied to 0th and 4th bits of the shift register 1071. The outputs of the 0th and 4th bits of the shift register 1071 and the output $P_4$ of the 4-bit counter 1043 are provided to the AND circuit 1093. When these inputs are "1", that is, when the fundamental picture elements are both black, the AND circuit 1093 yields an output "1", which is supplied to the AND circuits 1094 and 1095. On the other hand, the output at the terminal 1041-1 of the counter 1041 is applied, in an inverted form, to the AND circuit 1094 and, at the same time, is fed as it is to the AND circuit 1095. Consequently, when the fundamental picture elements are both black and no elemental picture element (2) exists, the output at the output terminal 1041-1 of the counter 1041 is "0", so that the output "1" from the AND circuit 1094 is applied to the counter 1044 to successively counter the number of black-black picture element blocks. When the output at the output terminal 1041-1 of the counter 1041 is "1", that is, in a case of the elemental picture element (2), the AND circuit 1094 provides an output "0", and the AND circuit 1095 produces an output "1", which is applied to the counter 1044 to stop the counting operation thereof. As a consequence, the count value of the counter 1044 indicates which one of the picture element of the black-black picture element group is the elemental picture element (2).

This value is encoded by the coder 1051 using the $B_1$ code. In the example of the facsimile signal of FIG. 8A, second and fourth picture elements are encoded into

 and 

respectively, and stored in the buffer register 81. Next, from the shift register 1071 and the memory 1022 for the preceding line are simultaneously read picture elements of the same position bit by bit and applied to the EOR circuit 96 to produce an output "0" or "1" in dependence on whether the corresponding fundamental picture elements of the preceding and the coding line are coincident with each other such as white and white or black and black, or different from each other such as white and black or black and white. The output from the EOR circuit 1096 is provided to the gates 1061, 1062 and 1063.

Since these gates 1061, 1062 and 1063 are each opened by one of the aforementioned state signals $S_2$, $S_1$ and $S_0$ corresponding thereto, the output from the EOR circuit 1096 is counted by the counters 1045, 1046 and 1047. These counters 1045, 1046 and 1047 each continue counting in a case of the input pulse being of the same polarity as the preceding one but discontinue counting in a case of the input pulse being different in polarity from the preceding one. When they have counted values "0" (hit), they are encoded by the coders 1052, 1053 and 1054 using the $B_1$ code, and when the count values are "1" (miss), they are encoded using 1·2·3·4·$B_1$ code.

The counters 1045, 1046 and 1047 count the "hit" and the "miss" alternately in respect of the states "2", "1" and "0" respectively.

In such a facsimile signal as shown in FIG. 8A, second, third, sixth and seventh fundamental picture elements are "hit", so that "0", "0", "0", "0" are applied to the counter 1045 for the state "2". But since the ninth fundamental picture element is "miss", "1" opposite in polarity to the preceding input signal is applied to the counter 1045, so that the counter once stops counting, and the abovesaid count value "4" is encoded by the coder 1052 into $$\underbrace{1\ 0\ 0\ 1.}$$

Upon application of the encoded output to the buffer memory 1082, the counter 1045 counts "1" on the basis of "1" of the ninth fundamental picture element, but since the succeeding tenth fundamental picture element is "hit", the counter 1045 stops the counting, and this count value is encoded. Since the succeeding eleventh fundamental picture element is "miss", the count value "1" is encoded and then provided to the buffer memory 1082. Accordingly, in the example of FIG. 8A, in a case of the state "2", hit "4", "miss" 1, "hit" 1 and "miss" 1 are respectively encoded into $$\underbrace{1001\ \ 0\ 00\ \ 0,}$$

as indicated by the state 2 in FIG. 8B. In a likewise manner, the counters 1046 and 1047 count the "hit" and "miss" in respect of the states "1" and "0" respectively, and their count values are encoded and applied to the buffer memories 1083 and 1084 respectively.

The shift register 1072 reads out the content of the memory 1021 of one line as is the case with the shift register 1071, but since the gate 1064 is opened only when the output at the output terminal 1041-1 of the counter 1041 is "1", so that the original information of the aforementioned elemental picture element (2) is encoded directly by the encoder 1055 and applied to the buffer memory 85.

This encoding may be performed following the pattern of the original information, or corresponding to twenty-two combinations of white and black elemental picture elements.

The counter 1042 counts clock pulses applied from the clock pulse generator 1010 but is reset by the output $P_4$ from the 4-bit counter 1043, as described previously. Upon detection of a change picture element by the change picture element detector 1031, the counter 1042 stops its counting operation; consequently, the distance from the immediately preceding fundamental picture element to the change point of the elemental picture element is counted. The output from the counter 1042 is applied via the gate 1065 to the coder 1056, but since the gate 1065 is opened by the output "1" at the output terminal 1041-2 of the counter 1041, the signal encoded by the coder 1056 represents the elemental picture element (1) which corresponds to the distance from the fundamental picture element to the change point of the elemental picture element in the picture element block in which the fundamental picture element changes from white to black or vice versa. This encoding is performed using the 2-bit fixed code shown in Table 1(C), as mentioned previously, and in the example of FIG. 8A, $$\underbrace{1\ 0\ 0\ 1\ 1\ 0\ 1\ 0}$$

is resulted, and this encoded output is stored in the buffer memory 1086.

When encoding of one line has thus been completed, encoded signals of the "hit" and the "miss" of the fundamental picture elements for each of the states "0", "1" and "2" are stored in the buffer memories 1082, 1083 and 1084; an encoded signal representing which one of the picture elements in the black-black picture element block is the elemental picture element (2) and the original information of the picture element block are stored in the buffer memories 1081 and 1085; and an encoded signal representing the position of the elemental picture element (1) is stored in the buffer memory 1086. Thereafter, the contents of the buffer memories 1081, 1082, 1083, 1084, 1085 and 1086 are properly read therefrom into the signal combiner 1120 and combined into an encoded output of one line, thereafter being sent out from the output terminal 1130, as shown in FIG. 8B.

The decoding operation is performed by reversing the encoding operation described above.

Figure 10A:
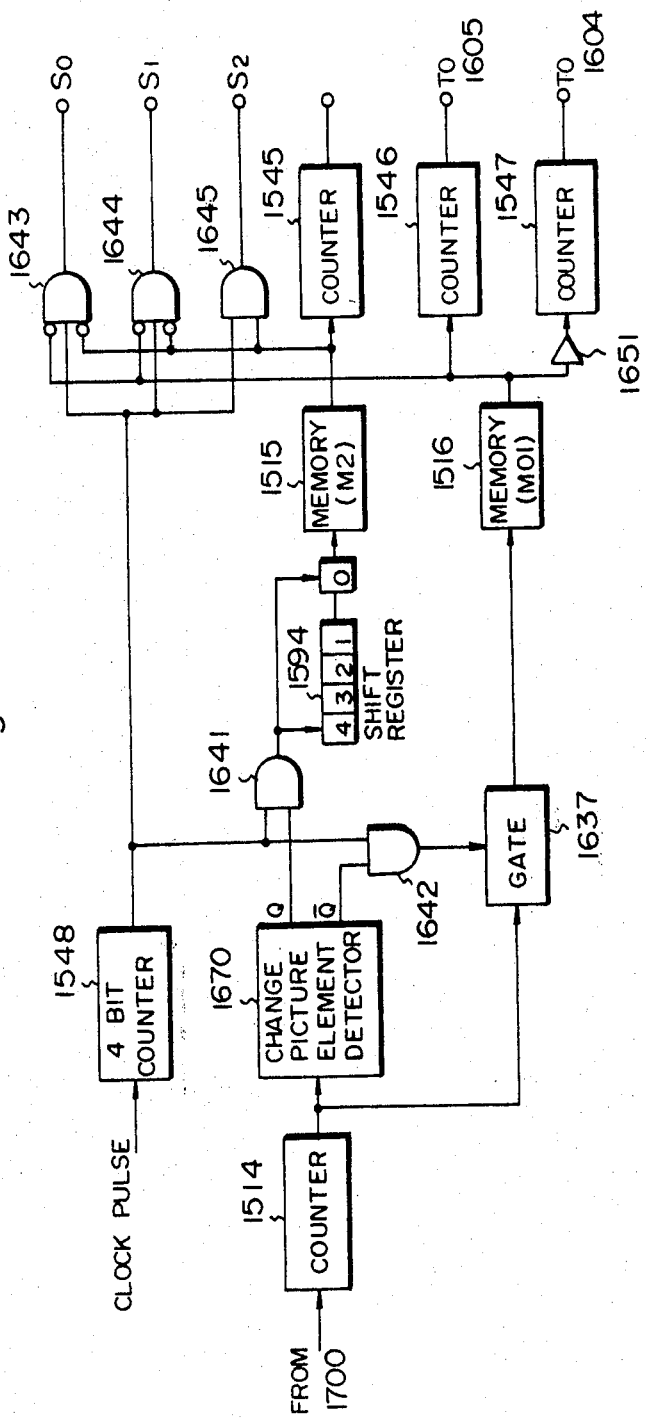
Figure 10B:
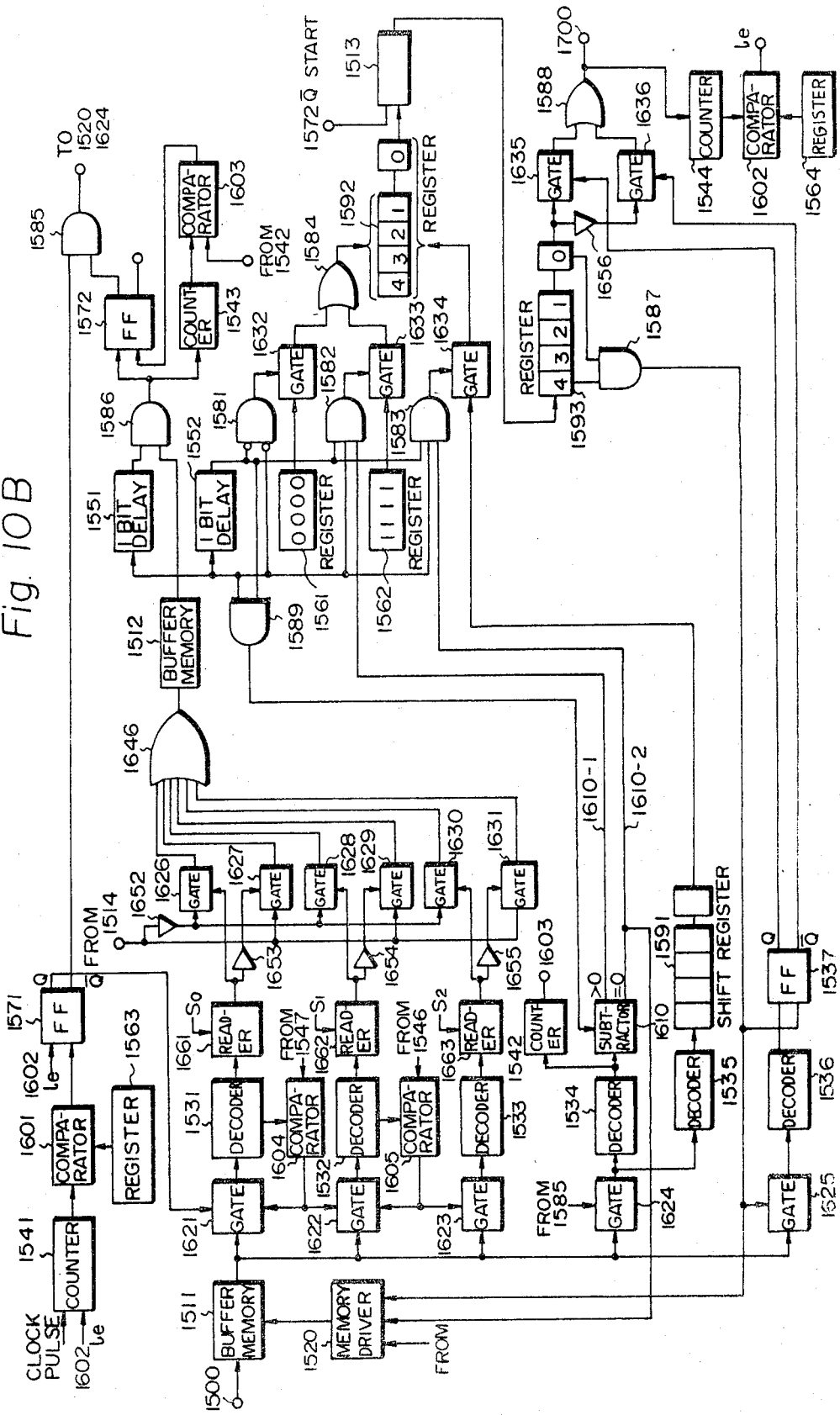

FIGS. 10A and 10B jointly illustrate an example of a decoding device. In FIGS. 10A and 10B, reference numeral 1500 indicates an input terminal; 1511, 1512, 1513, 1514, 1515 and 1516 designate memories; 1520 identifies a memory drive circuit; 1531, 1532, 1533, 1534, 1535 and 1536 denote decoders; 1541, 1542, 1543, 1544, 1545, 1546, 1547 and 1548 represent counters; 1511 and 1552 show 1-bit delay circuits; 1561, 1562, 1563 and 1564 refer to registers; 1571, 1572 and 1573 indicate flip-flops; 1581, 1643 and 1644 designate AND circuits with a NOT input; 1582, 1583, 1585, 1586, 1589, 1641, 1642 and 1645 identify AND circuits; 1584, 1588 and 1646 denote OR circuit (EOR circuit); 1591, 1593 and 1594 show shift registers; 1601, 1602, 1603, 1604 and 1605 refer to comparators; 1610 indicates a subtractor; 1621, 1622, 1623, 1624, 1625, 1626, 1627, 1628, 1629, 1630, 1631, 1633, 1634, 1635 and 1656 identify NOT circuits; 1661, 1662 and 1663 denote readers; 1670 represents a change picture element detector; and 1700 shows an output terminal.

A detailed description will be given of the operation of the decoding device shown in FIGS. 10A and 10B.

For decoding, it is necessary to determine the state of the fundamental picture element at first. This is performed using information of the preceding line as in the case of the encoding apparatus.

In the memory 1514, an output signal of each line is stored as the preceding line signal from the output terminal 1700, and the stored content is applied to the change picture element detector 1670 bit by bit. Depending on whether or not it detects a change picture element, the change picture element detector 1670 produces "1" at its Q or $\bar{Q}$ output, which is supplied via the AND circuit 1641 or 1642 to the memory 1515 or 1516 to apply information of the state "2" to the former or the state "0" or "1" to the latter, as is the case with the encoding apparatus described previously in respect of FIG. 9.

The outputs $S_0$, $S_1$ and $S_2$ from the AND circuits 1643, 1644 and 1645 are state signals respectively corresponding to the states "0", "1" and "2", and these signals are employed for controlling the reader described later. The counters 1547, 1546 and 1545 are to count the number of fundamental picture elements of the states "0", "1" and "2" on one line on the basis of the contents of the memories 1516 and 1515, and the resulting outputs are each used for comparison by a comparator during decoding in each state described later.

The encoded signal from the input terminal 1500 is once stored in the buffer memory 1511 and read therefrom under the control of the memory drive circuit 1520.

Upon application of a clock pulse and a one line end signal le from the comparator 1602 to the counter 1541, its output is compared by the comparator 1601 with the output from the one line fundamental picture element number register 1563. For example, when the number of picture elements of one line is 1728 and N=4, 433 is stored as the number of fundamental picture elements. When the both inputs coincide with each other, the flip-flop 1571 is inverted by the coincidence output from the comparator 1601. That is, this circuit arrangement is to detect whether the input picture element is the fundamental picture element or not, and the gate 1621 is opened and closed by "1" or "0" of the output Q of the flip-flop 1571 (to the upper terminal of which is applied the signal le from the comparator 1602.

When the gate 1621 is opened by the output Q from the flip-flop 1571, the signal read from the buffer memory 1511 is a signal of the state "0" and is decoded by the decoder 1531. At this time, the gates 1622 and 1623 are held closed.

Those of the signals decoded by the decoder 1531 which correspond to the number of fundamental picture elements are provided to the comparator 1604, but since the output from the counter 1547, that is, the number of fundamental picture elements of the state "0" in one line is also applied to the comparator, the decoder 1531 continues decoding until these two input values coincide with each other. At the same time as the gate 1622 is opened by the coincidence output from the comparator 1604, the gate 1621 is closed.

The gate 1622 permits the passage therethrough of the signal of the state "1" from the buffer memory 1511 to the decoder 1532, and as is the case with the state "0", this signal is compared by the comparator 1605 with the output from the counter 1546, that is, the number of fundamental picture elements of the state "1" in one line. When the both inputs coincide with each other, the output from the comparator 1605 simultaneously closes the gate 1622 and opens the gate 1623, and the signal of the state "2" is applied to the decoder 1533 and decoded.

The information thus decoded for each state is stored in the decoders 1531, 1532 and 1533, and each time any one of the state signals $S_0$, $S_1$ and $S_2$ always read from the memories 1515 and 1516 and detected in the order of the fundamental signals is applied to the readers 1661, 1662 and 1663, the decoded signal is read from the corresponding one of the above decoders.

For example, in the case of FIG. 8A, since the first fundamental picture element is in the state "0", the state signal $S_0$ is provided to the reader 1661 to open it.

In the decoder 1531, decoding corresponding to "hit" 2, "miss" 1, "hit" 1 in the state "0" takes place and $$\underbrace{0\ 0\ 1\ 0}$$

is stored therein, but the state "0" of the first fundamental picture element is read first by the 1-bit signal $S_0$. Then, since the second fundamental picture element is of the state "2", the signal $S_2$ is supplied to the reader 1663 to read from the decoder 1533 the first "0" of $$\underbrace{0000\quad 1\quad 0\quad 1}$$

corresponding to "hit" 4, "miss" 1, "hit" 1, "miss" 1 stored after being decoded. Similarly, since the third fundamental picture element is in the state "2", the second "0" is read from the decoder. The fourth fundamental picture element is in the state "1", so that the reader 1662 is opened by the signal $S_1$ to read "0" of the first "hit" of the decoded signal from the decoder 1532.

In this manner, "0" or "1" is derived as the output from each of the reader 1661, 1662 and 1663 according to the "hit" or "miss". As described previously, the "hit" is a signal of the same polarity as the fundamental picture element of the preceding line, and the "miss" is a signal different in polarity as the fundamental picture element of the preceding line, so that the output "1" of the reader 1661 opens the gate 1626, and in a case of the output "0", it is inverted by the NOT circuit 1653 and applied to the gate 1627 to open it.

Likewise, the reader 1662 is arranged to open the gate 1628 with the output "1" and the gate 1629 with the output "0", and the reader 1663 is arranged to open the gate 1630 with the output "1" and the gate 631 with the output "0".

Since the outputs which are applied "1" from the readers 1661, 1662 and 1663 to the gates 1626, 1628 and 1630 respectively, are all "miss" information, a signal obtained by inverting the preceding line information from the memory 1514 by the NOT circuit 1652 is provided to each of the above gates. The gates 1627, 1629 and 1631 are opened by signals obtained by inverting the outputs "0" from the readers 1661, 1662 and 1663 by the NOT circuits 1653, 1654 and 1655 respectively. Further, since the outputs "0" from the readers 1661, 1662, and 1663 are "hit", it is necessary to apply the preceding line information of the memory 1514 directly to the gates 1627, 1629 and 1631.

By such control using the state signals $S_0$, $S_1$ and $S_2$, the information stored in the decoders 1531, 1532 and 1533 is read out, and information indicating whether or not the readout information is the same as the signal of the preceding line is applied to the OR circuit 646.

The OR circuit 1646 permits the passage therethrough of any one of these inputs to the buffer memory 1512, and this is accurate information of the fundamental picture elements. But the fundamental picture element changed from white to black by the pre-processing due to the elemental picture element (2) remains unchanged.

In the example of decoding the facsimile signal of FIG. 8A,

0011110011110
|_____| is stored in the buffer memory 1512.

Next, the output read from the buffer memory 1512 and the output from the 1-bit delay circuit 1551 are applied to the AND circuit 1586, and when the both inputs are "1", that is, when the fundamental picture elements are both black, the AND circuit 1586 produces an output "1", and the sum total of the black-black picture elements is counted by the counter 1543. The count value of the counter 1543 is compared by the comparator 1603 with the number of the black-black picture element blocks counted by the counter 1542 described later, and the flip-flop 1572 operates so that the AND circuit 1585 produces an output "1" until the inputs to the comparator 1603 become equal to each other.

Thus, when the output from the AND circuit 1585 is "1", the gate 1624 opens to pass the signal from the buffer memory 1511 to the decoder 1534.

The decoder 1534 decodes which one of the black-black picture element block is the input signal thereto, and applies the decoded value to the subtractor 1610 and, at the same time, to the counter 1542 for counting.

The signal read from the buffer memory 1512 and the signal from the 1-bit delay circuit 1552 are both applied to the AND circuit 1589. When the both inputs are "1", that is, in a case of the black-black picture element block, the AND circuit 1589 yields an output "1", which is applied to the subtractor 1610. Accordingly, if the signal applied to the subtractor 1610 from the decoder 1534 is "2", then the subtractor 1610 derives an output "1" at its terminal 1610-1 representing (>0) when the output "1" from the AND circuit 1589 is applied first. The subtractor output is provided to the AND circuit 1582, to which are also supplied the signal read from the buffer memory 1512 and a signal obtained by delaying it for one bit with the 1-bit delay circuit 1552. When these three inputs are all "1", the AND circuit 1582 produces an output "1". This indicates that adjacent fundamental picture elements are both black, that no change point exists between them and that the elemental picture elements are all black in this picture element block. As a consequence, the gate 1633 is opened by the output "1" from the AND circuit 1582, permitting "1111" stored in the register 1562 to the OR circuit 1584.

When the signal read from the buffer memory 1512 and the signal delayed for one bit relative to the above signal by the 1-bit delay circuit 1552 are both "0", the adjacent fundamental picture elements are both white; in this case, these signals are inverted and then applied to the AND circuit 1581, so that the AND circuit 1581 produces an output "1" to open the gate 1632, resulting in "0000" stored in the register 1561 being read out therefrom and applied to the OR circuit 1584.

In this manner, the signal "0000" or "1111" is applied via the gate 1632 or 1633 to the OR circuit 1584 in accordance with the order of decoding of the fundamental picture elements and stored as a 4-bit signal in the shift register 1592.

When a second "1" of the output from the AND circuit 1589 is applied to the subtractor 1610, the subtractor 1610 produces an output "1" at its terminal 1610-2 representing (=0). This output is provided to the AND circuit 1583, but since the signal read from the buffer memory 1512 and the signal delayed for one bit relative thereto by the 1-bit delay circuit 1552 are supplied to the AND circuit 1583 as is the case with the AND circuit 1582, that these inputs all "1" means that adjacent fundamental picture elements are both black and that the elemental picture element (2) exists between them. As a consequence, the gate 1634 is opened by the output "1" from the AND circuit 1634, and the signal stored in the shift register 1591 is transferred to the shift register 1592.

When the output of the subtractor 1610 at the terminal 1610-2 is "1", it is applied to the memory drive circuit 1520 and further provided via the buffer memory 1511 and the gate 1624 to the decoder 1535 and decoded thereby into the original signal, thereafter being stored as a 5-bit signal in the shift register 1591. By the above operation, for example, the original information 1 1 0 1 1,
|_____| of the second elemental picture element (2) is stored in the shift register 1591. Thereafter, as is the case with the above, "4" decoded by the decoder 1534 is applied to the comparator 1610, and at the same time, the output "1" is applied to the subtractor 1610 from the AND circuit 1589 each time adjacent fundamental picture elements are both black, and until the output (=0) to the terminal 1610-2 becomes "1", the gate 1633 is opened by the output (>0) "1" to the terminal 1610-1 to apply "1111" to be the OR circuit 1584 in the same manner as described above. When the output from the AND circuit 1589 becomes "4", the output (=0) from the subtractor 1610 to the terminal 1610-2 becomes "1" to open the gate 1634, through which 0 0 1 1 0
|_____| decoded by the decoder 1535 and stored in the register 1591 is stored in the shift register 1592 at the corresponding position.

Next, when the outputs from the counters 1542 and 1543 becomes equal to each other, the comparator 1603 yields an output "1", by which the output from the flip-flop 1572 is inverted, and its output Q to the AND circuit 1585 becomes "0" to close the gate 1624. At the same time, the memory 1513 of one line starts storing of the shift register 1592 with $\overline{Q}=1$. This stored content is read out into the shift register 1593, from which bits of the fundamental picture elements of 0th and fourth bits are applied to the EOR circuit 1587. When these bits are "1" and "0" or "0" and "1", that is, in a case of the picture element block in which adjacent fundamental picture elements are respectively black and white or vice versa, the EOR circuit 1587 yields an output "1", by which the gate 1625 is opened, and the signal read from the buffer memory 1511 is decoded by the decoder 1536.

This decoded signal corresponds to the elemental picture element (1) and indicates in which picture element the change point of the elemental picture element exists from the immediately preceding fundamental picture element. For example, if it is detected as a result of decoding by the decoder 1536 that an information change exists at a position "3" from the immediately preceding picture element, the output Q from the flip-flop 1573 immediately becomes "0" and the output $\overline{Q}$ becomes "1", closing the gate 1635 and opening the gate 1636.

The content of the shift register 1593 is provided to the gate 1636 directly or via the NOT circuit 1656, but since the NOT circuit 1656 inverts the input from "k" to "0" or "0" to "1", the content of the shift register 1593 is corrected by opening and closing of the gates 1635 and 1636 to a correct white-black or black-white signal, which is applied to the OR circuit 1588. That is, in the example of encoding shown in FIG. 8A, since the first elemental picture element (1) is "3", the signal inverted by the NOT circuit 1656 passes through the gate 1636 after three picture elements, and before this, a non-inverted signal read from the shift register 1593 is provided to the OR circuit 1588, so that encoded facsimile signals are all decoded and derived at the output terminal 1700.

At the same time, the output from the OR circuit 1588 is applied to the counter 1544 for counting, and the counter output is always compared by the comparator 1602 with the output from the one line picture element number register 1564. For example, when the count value reaches the number of picture element of one line, 1728, the comparator 1602 yields the one line end signal le, which is provided to the flip-flop 1571, starting decoding of a new scanning line.

In the above-described embodiment of this invention, the fundamental picture elements of the preceding line are classified into the states "0", "1" and "2", and the fundamental picture elements of the coding line at the corresponding positions are compared in state with the fundamental picture elements of the preceding line, and the "hit" and "miss" for each state are encoded; but instead of such classification of the fundamental picture elements according to their state, it is also possible to compare information of the fundamental picture elements of same position on the preceding line and the coding line and encode the "hit" and "miss" into run length codes.

A description will hereunder be given of another embodiment of this invention using such a method.

Figure 11A:
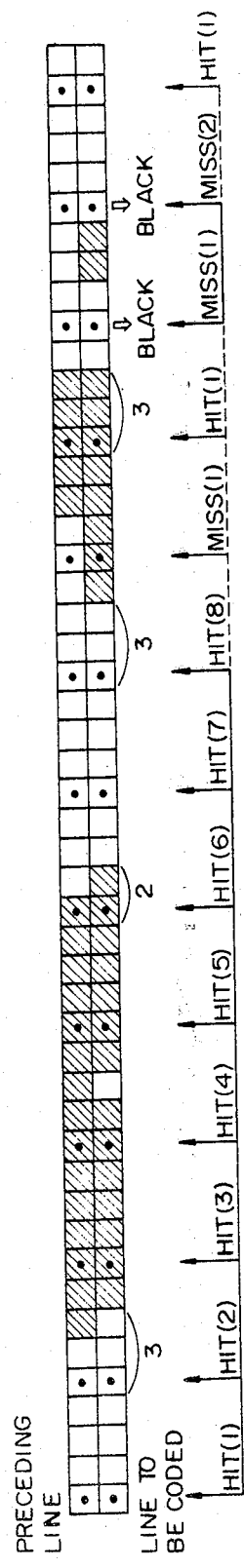

FIG. 11A is a diagram, similar to FIG. 8A, showing an example of a facsimile signal, which is shown to be exactly the same pattern as that in FIG. 8A, for convenience of description.

Also in this embodiment, when the elemental picture element (2) exists in the coding line, the pre-processing of changing the fundamental picture elements on both sides of the picture element block to black, as is the case with the foregoing embodiment. Next, these fundamental picture elements are each compared with that of the same position on the preceding line and classified into "hit" and "miss" in dependence on whether or not they coincide with the latter, and the numbers of "hit" and "miss" are successively encoded.

In the example of FIG. 11A, "hit" 8, "miss" 1, "hit" 1, "miss" 2 and "hit" successively appear, so that the "hit" is encoded using the B₁ code and the "miss" is encode using the 1·2·3·4 B₁ code.

Procedures for the elemental picture elements (2) and (1) are the same as those employed in the foregoing embodiment.

Figure 11B:
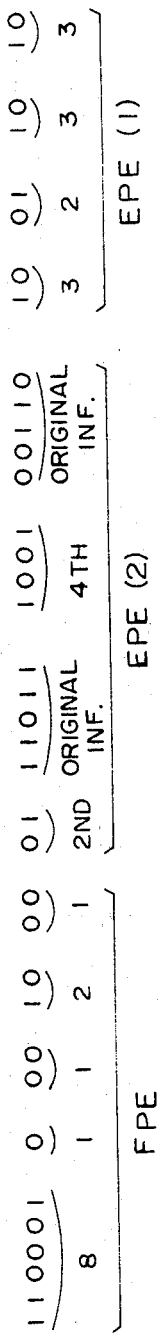

Accordingly, in the present embodiment, the facsimile signal of FIG. 11A becomes such an encoded signal series as shown in FIG. 11B.

This embodiment is far simpler than the foregoing embodiment; and when carrying this embodiment into practice, if the fundamental picture element signals of the preceding line and the coding line are applied to an EOR circuit, "hit" 0 and "miss" 1 are derived therefrom, so that this output is counted by a counter and then encoded by an encoder. Therefore, the encoding apparatus is simple as compared with that needed in the foregoing embodiment.

The decoding device also does not require that part of the circuit of the foregoing embodiment FIGS. 10A and 10B which is provided for identification of the state of the preceding line and can be obtained by some modifications; accordingly, no detailed description is given of the decoding apparatus.

As the means for comparing the fundamental picture elements of the coding line with those of the preceding line and encoding the comparison results, various other means can be used.

As has been described in the foregoing, in the coding method of this invention, the scanning line of a facsimile signal is divided into blocks, which are each subdivided into fundamental picture elements and elemental picture elements, and for encoding of the fundamental picture elements, they are compared with fundamental picture element signals of the preceding line. Accordingly, also on the side of the decoding device, picture elements of the coding line can be decoded using information of the decoded preceding line.

In this manner, encoding and decoding are performed successively employing fundamental picture element information of the immediately preceding scanning line, so that if an code error occurs due to a circuit noise or the like, or if a picture signal of a line is not correctly reproduced, picture signals of the succeeding lines may not correctly be reproduced to markedly degrade the reproduced picture.

Accordingly, the above embodiment does not present any problem when employed in a four-wire private line, data communication network or the like which permits the use of the request repeat system when a code error is detected, but in a case of a two-wire system such as an ordinary telephone circuit, it is difficult to prevent an error from spreading.

Figure 12:
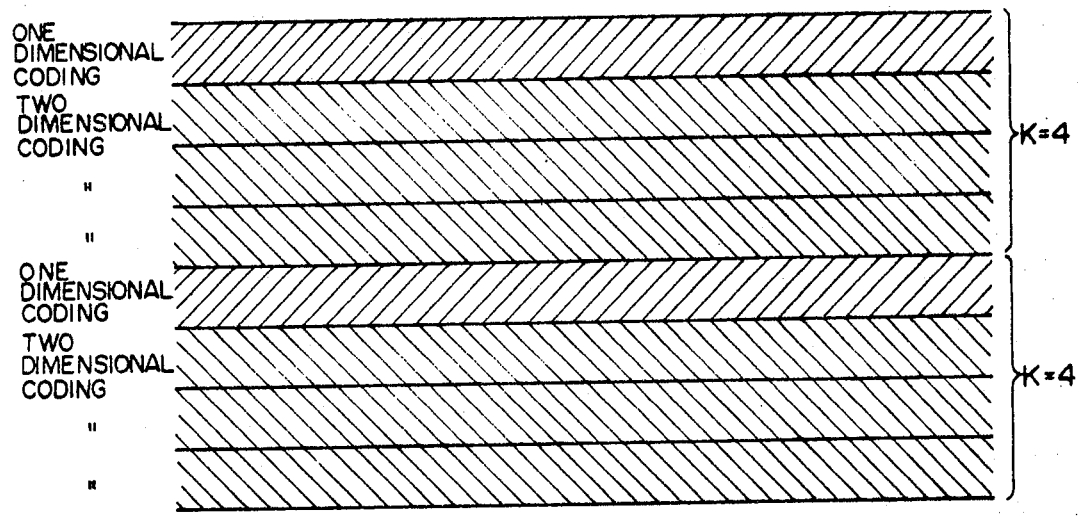

The following will describe a method for limiting degradation of the reproduced picture quality resulting from a code error. That is, as shown in FIG. 12, the present invention employs, every predetermined period of K lines (in FIG. 12, K=4), a one-dimensional coding method of encoding fundamental picture elements of the coding line without using the fundamental picture element information of the preceding line and performs the two-dimensional coding of the invention for the following lines.

Such a method can be achieved by controlling, with a suitable switch control circuit or the like, two-dimensional coded signals from being outputted in excess of K−1 lines, and the decoding apparatus is also available by some modifications of the circuit structure.

It is a matter of course that control codes for identification of one-dimensional and two-dimensional coding line signals are inserted therein immediately before starting of encoding of the coding lines and that at the decoding device, a suitable decoding operations are performed by detecting the control codes.

Thus, the present invention has the advantages that degradation of the picture quality resulting from a code error can be prevented from extending to the succeeding lines and that the reproduced picture can rapidly be restored from the state of the code error.

As has been described in the foregoing, the present invention permits a substantial reduction of the amount of information to be transmitted and markedly lessening of the influence of the transmission error, as compared with the prior art systems; therefore, the invention is of great utility in practical use.

What we claim is:

1. In a one-dimensional coding method for a facsimile signal in which a binary facsimile signal obtained by scanning an original picture and by successively sampling into picture elements is applied as an input and the position of an information change picture element having changed from one to the other of a binary signal value is encoded and outputted for each line, an improvement of the method comprising:
   a first step of sampling from the facsimile signal of one line, as fundamental picture elements, picture elements positioned every predetermined number of picture elements in the scanning line direction;
   a second step of detecting an information change in elemental picture elements of each picture element block between adjacent ones of the fundamental picture elements;
   a third step of once converting to black the fundamental picture elements on both sides of the picture element block when more than two information changes are detected in the second step;
   a fourth step of encoding the numbers of successive white and black fundamental picture elements into run length codes after the third step;
   a fifth step of encoding the position of that one of black-black picture element blocks obtained by the third step and sandwiched between the adjacent black fundamental picture elements which has more than two information changes in the elemental picture elements, and original information of the elemental picture elements in the black-black picture element block before conversion of the fundamental picture elements on the both sides thereof to black;
   a sixth step of encoding the position of an information change picture element in the picture element block sandwiched between the adjacent fundamental picture elements when they have their information changed from white to black or vice versa; and
   a seventh step of combining the encoded outputs of the fourth, fifth and sixth steps into a composite signal for output to the outside.

2. In a one-dimensional coding method for a facsimile signal in which a binary facsimile signal obtained by scanning an original picture and by successively sampling into picture elements is applied as an input and the position of an information change picture element having changed from one to the other of a binary signal value is encoded and outputted for each line, an improvement of the method comprising:
   a first step of sampling from the facsimile signal of one line, as fundamental picture elements, picture elements positioned every predetermined number of picture elements in the scanning line direction;
   a second step of detecting an information change in elemental picture elements of each picture element block between adjacent ones of the fundamental picture elements;
   a third step of performing such conversion that more than two information changes, if detected in the second step, are reduced to less than or equal to one;
   a fourth step of encoding the numbers of successive white and black fundamental picture elements into run length codes after the third step;
   a fifth step of encoding the position of an information change picture element in the picture element block sandwiched between the adjacent fundamental picture elements when they have their information changed from white to black or vice versa; and
   a sixth step of combining the encoded outputs of the fourth and fifth steps into a composite signal for output to the outside.

3. In a one-dimensional coding method for a facsimile signal in which a binary facsimile signal obtained by scanning an original picture and by successively sampling into picture elements is applied as an input and the position of an information change picture element having changed from one to the other of a binary signal value is encoded and outputted for each line, an improvement of the method comprising:
   a first step of sampling from the facsimile signal of one line, as fundamental picture elements, picture elements positioned every predetermined number of picture elements in the scanning line direction;
   a second step of detecting an information change in elemental picture elements of each picture element block between adjacent ones of the fundamental picture elements;
   a third step of performing such conversion that when more than two information changes are detected in the second step, the picture element block in which the elemental picture elements sandwiched between the information changes are small in number and lies substantially at the center of the picture element block, has no information change, and of temporarily converting to black the fundamental picture elements on both sides of the other picture element block;
   a fourth step of encoding the numbers of successive white and black fundamental picture elements into run length codes after the third step;
   a fifth step of encoding the position of one of black-black picture element blocks obtained by the third step and sandwiched between the adjacent black fundamental picture elements which has more than two information changes in the elemental picture elements, and original information of the elemental picture elements in the black-black picture element block before conversion of the fundamental picture elements on the both sides thereof to black;
   a sixth step of encoding the position of an information change picture element in the picture element block sandwiched between the adjacent fundamental picture elements when they have their information changed from white to black or vice versa; and
   a seventh step of combining the encoded outputs of the fourth, fifth and sixth steps into a composite signal for output to the outside.

4. In a two-dimensional coding method for a facsimile signal in which a binary facsimile signal obtained by scanning an original picture and by successively sampling into picture elements is applied as an input and the position of an information change picture element having changed from one to the other of a binary signal value is encoded and outputted for each line, an improvement of the method comprising:

a first step of sampling from the facsimile signal of one line, as fundamental picture elements, picture elements positioned every predetermined number of them in the direction of a scanning line;

a second step of detecting and storing the state of the fundamental picture elements on a line immediately preceding a line to be encoded;

a third step of classifying the fundamental picture elements on the line to be encoded into a state "0" or "1" in dependence on whether the corresponding fundamental picture elements on the immediately preceding line is white or black, and of classifying adjacent ones of the fundamental picture elements, into a state "2" regardless of the state "0" or "1" when an information change exists between the adjacent fundamental picture elements;

a fourth step of detecting an information change point in an elemental picture element in a picture element block between adjacent ones of the fundamental picture elements on the line to be encoded;

a fifth step of temporarily converting the fundamental picture elements on both sides of the picture element block when more than two information change points are detected in the fourth step;

a sixth step of comparing the fundamental picture elements on the line to be encoded in a signal train obtained by the fifth step with the fundamental picture elements on the immediately preceding line at the corresponding positions, and of encoding states "hit" and "miss" indicating whether the fundamental picture elements of the both lines are the same information or not, into run length codes for each of the states "0", "1" and "2";

a seventh step of encoding the position of one of black-black picture element blocks sandwiched between the adjacent black fundamental picture elements of the code train obtained by the fifth step which has more than infomation change points in the elemental picture elements, and of encoding the original information of the elemental picture element of the black-black picture element block before the conversion in the fifth step;

an eighth step of encoding the position of the information change picture element in the elemental picture elements of the picture element block sandwiched between adjacent fundamental picture elements of the state "2"; and a ninth step of combining the encoded outputs of the sixth, seventh, eighth steps into a composite signal for output to the outside.

5. In a two-dimensional coding method for a facsimile signal in which a binary facsimile signal obtained by scanning an original picture and by successively sampling into picture elements is applied as an input and the position of an information change picture element having changed from one to the other of a binary signal value is encoded and outputted for each line; an improvement of the method comprising:

a first step of sampling from the facsimile signal of one line, as fundamental picture elements, picture elements positioned every predetermined number of them in the direction of a scanning line;

a second step of detecting and storing the state of the fundamental picture elements on a line immediately preceding a line to be encoded;

a third step of classifying the fundamental picture elements on the line to be encoded into a state "0" or "1" in dependence on whether the corresponding fundamental picture elements on the immediately preceding line is white or black, and of classifying adjacent ones of the fundamental picture elements, into a state "2" regardless of the state "0" or "1" when an information change exists between the adjacent fundamental picture elements;

a fourth step of detecting an information change point in an elemental picture element in a picture element block between adjacent ones of the fundamental picture elements on the line to be encoded;

a fifth step of temporarily converting the fundamental picture elements on both sides of the picture element block when more than two information change points are detected in the fourth step;

a sixth step of comparing the fundamental picture elements on the line to be encoded in a signal train obtained by the fifth step with the fundamental picture elements on the immediately preceding line at the corresponding positions, and of encoding states "hit" and "miss" indicating whether the fundamental picture elements of the both lines are the same information or not, into run length codes for each of the states "0", "1" and "2";

a seventh step of encoding the position of one of black-black picture element blocks sandwiched between the adjacent black fundamental picture elements of the code train obtained by the fifth step which has more than information change points in the elemental picture elements, and of encoding the original information of the elemental picture element of the black-black picture element block before the conversion in the fifth step;

an eighth step of encoding the position of the information change picture element in the elemental picture elements of the picture element block sandwiched between adjacent fundamental picture elements of the state "2";

a ninth step of temporarily stopping the two-dimensional coding operation of the sixth step when the numbers of lines encoded by the sixth, seventh and eighth steps respectively reach preset values, and of encoding only the next coding line without comparing the fundamental picture elements with those of a line immediately preceding it; and a tenth step of combining the encoded outputs of the sixth, seventh, eighth and ninth steps into a composite signal for output to the outside.

6. In a two-dimensional coding method for a facsimile signal in which a binary facsimile signal obtained by scanning an original picture and by successively sampling into picture elements is applied as an input and the position of an information change picture element having changed from one to the other of a binary signal value is encoded and outputted for each line, an improvement of the method comprising:

a first step of sampling from the facsimile signal of one line, as fundamental picture elements, picture elements positioned every predetermined number of them in the direction of a scanning line;

a second step of detecting an information change point in an elemental picture element in a picture element block between adjacent ones of the fundamental picture elements on the line to be encoded;

a third step of once conveying the fundamental picture elements on both sides of the picture element block when more than two information change points are detected in the second step;

a fourth step of comparing the fundamental picture elements on the line to be encoded in a signal train obtained by the third step with the fundamental picture elements on the immediately preceding line at the corresponding positions, and of encoding states "hit" and "miss" indicating whether the fundamental picture elements of the both lines are the same information or not, into run length codes for each of the states "0", "1" and "2";

a fifth step of encoding the position of one of black-black picture element blocks sandwiched between the adjacent black fundamental picture elements of the code train obtained by the third step which has more than information change points in the elemental picture elements, and of encoding the original information of the elemental picture element of the black-black picture element block before the conversion in the third step;

a sixth step of encoding the position of a change picture element in the elemental picture elements of the picture element block sandwiched between adjacent ones of the fundamental picture elements having information changed from white to black or black to white; and a seventh step of combining the encoded outputs of the fourth, fifth and sixth steps into a composite signal for output to the outside.

7. In a two-dimensional coding method for a facsimile signal in which a binary facsimile signal obtained by scanning an original picture and by successively sampling into picture elements is applied as an input and the position of an information change picture element having change from one to the other of a binary signal value is encoded and outputted for each line, an improvement of the method comprising:

a first step of sampling from the facsimile signal of one line, as fundamental picture elements, picture elements positioned every predetermined number of them in the direction of a scanning line;

a second step of detecting an information change point in an elemental picture element in a picture element block between adjacent ones of the fundamental picture elements on the line to be encoded;

a third step of temporarily converting the fundamental picture elements on both sides of the picture element block when more than two information change points are detected in the second step;

a fourth step of comparing the fundamental picture elements on the line to be encoded in a signal train obtained by the third step with the fundamental picture elements on the immediately preceding line at the corresponding positions, and of encoding states "hit" and "miss" indicating whether the fundamental picture elements of the both lines are the same information or not, into run length codes for each of the states "0", "1" and "2";

a fifth step of encoding the position of one of black-black picture element blocks sandwiched between the adjacent black fundamental picture elements of the code train obtained by the third step which has more than information change points in the elemental picture elements, and of encoding the original information of the elemental picture element of the black-black picture element block before the conversion in the third step;

a sixth step of encoding the position of a change picture element in the elemental picture elements of the picture element block sandwiched between adjacent ones of the fundamental picture elements having information changed from white to black or black to white;

a seventh step of temporarily stopping the two-dimensional coding operation of the fourth step when the numbers of lines encoded by the fourth, fifth and sixth steps respectively reach preset values, and of encoding only the next coding line without comparing the fundamental picture elements with those of a line immediately preceding it; and an eighth step of combining the encoded outputs of the fourth, fifth, sixth and seventh steps into a composite signal for output to the outside.

* * * * *